(12) United States Patent
Nakamura et al.

(10) Patent No.: US 7,229,138 B2
(45) Date of Patent: Jun. 12, 2007

(54) BRAKE FLUID PRESSURE CONTROL DEVICE

(75) Inventors: Eiji Nakamura, Nishikamo-gun (JP); Akihiro Otomo, Toyota (JP); Masanori Hirose, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/141,109

(22) Filed: Jun. 1, 2005

(65) Prior Publication Data

US 2005/0225168 A1    Oct. 13, 2005

Related U.S. Application Data

(62) Division of application No. 10/856,931, filed on Jun. 1, 2004, which is a division of application No. 09/731,923, filed on Dec. 8, 2000, now Pat. No. 6,761,418.

(30) Foreign Application Priority Data

Dec. 27, 1999 (JP) ................. 11-370507

(51) Int. Cl.
*B60T 8/36* (2006.01)
(52) U.S. Cl. ............... 303/119.2; 303/20; 303/122.04; 320/104; 324/426
(58) Field of Classification Search ........... 303/119.2, 303/20, 113.1, 166, 168, DIG. 9, 122.04, 303/122.05, 122.06; 320/103, 104, 116, 320/117, 119, 121, 123, 140; 324/426, 429, 324/433, 434
See application file for complete search history.

(56) References Cited

U.S. PATENT DOCUMENTS 4,345,796 A    8/1982  Reinecke (Continued)

FOREIGN PATENT DOCUMENTS

DE    196 34 567 A1    3/1998

(Continued)

OTHER PUBLICATIONS

SAE 960991, 1996, "Electrohydraulic Brake System—The First Approach to Brake-By-Wire Technology", Jonner et al., pp. 105-112.

(Continued)

*Primary Examiner*—Pam Rodriguez
(74) *Attorney, Agent, or Firm*—Oliff & Berridge, PLC

(57) ABSTRACT

A brake fluid pressure control device controls brake fluid pressures through control of fluid pressure control valves operated in accordance with control signals from, for example, a computer. Signal lines for supplying control signals to control circuits controlling coils of linear valve devices for some wheels (e.g., front-left and rear-right wheels) are connected to a brake ECU by a connector, and signal lines for supplying control signals to the control circuits controlling coils of linear valve devices for other wheels (e.g., front-right and rear-left wheels) are connected to the brake ECU by a different connector. Thus, even if one of the connectors starts operating abnormally, it is possible to supply control signals via the signal lines connected by the other connector and control linear valve devices for some of the wheels (e.g., a pair of diagonally located wheels).

5 Claims, 15 Drawing Sheets

U.S. PATENT DOCUMENTS

| | | | |
|---|---|---|---|
| 4,850,650 A | 7/1989 | Eckert et al. | |
| 5,295,737 A | 3/1994 | Epple et al. | |
| 5,588,719 A | 12/1996 | Bailleux | |
| 5,752,748 A | 5/1998 | Schramm et al. | |
| 5,791,745 A | 8/1998 | Sakakibara | |
| 5,836,659 A | 11/1998 | Feigel et al. | |
| 5,952,799 A | 9/1999 | Maisch et al. | |
| 5,954,407 A | 9/1999 | Schramm et al. | |
| 5,979,999 A * | 11/1999 | Poertzgen et al. | 303/116.1 |
| 6,076,897 A | 6/2000 | Binder et al. | |
| 6,126,248 A | 10/2000 | Kawahata et al. | |
| 6,138,801 A * | 10/2000 | Shirai et al. | 188/157 |
| 6,158,825 A | 12/2000 | Schunck et al. | |
| 6,186,602 B1 | 2/2001 | Jonner et al. | |
| 6,211,681 B1 | 4/2001 | Kagawa et al. | 324/426 |
| 6,231,133 B1 | 5/2001 | Tsukamoto | |
| 6,299,261 B1 | 10/2001 | Weiberle et al. | |
| 6,428,117 B1 * | 8/2002 | Messersmith | 303/3 |
| 6,476,515 B1 | 11/2002 | Yamamoto et al. | |
| 6,761,418 B2 * | 7/2004 | Nakamura et al. | 303/113.1 |

FOREIGN PATENT DOCUMENTS

| | | |
|---|---|---|
| DE | 198 35 881 A1 | 4/1999 |
| DE | 197 55 050 A1 | 7/1999 |
| DE | 199 41 481 A1 | 3/2001 |
| JP | 63-20256 | 1/1988 |
| JP | 5-65060 | 3/1993 |
| JP | 7-277175 | 10/1995 |
| JP | 10-76925 | 3/1998 |
| JP | A-10-59160 | 3/1998 |
| JP | 10-217936 | 8/1998 |
| JP | U-05-59067 | 8/1998 |
| JP | T-11-500380 | 1/1999 |
| JP | A-11-115717 | 4/1999 |
| WO | WO 95/13946 | 5/1995 |
| WO | WO 96/03300 | 2/1996 |
| WO | WO 96/29218 | 9/1996 |
| WO | WO 98/28174 | 7/1998 |

OTHER PUBLICATIONS

U.S. Appl. No. 09/377,616, filed Aug. 19, 1999.
Japanese Official Office Action Dated May 25, 2002.
English translation of Japanese Official Office Action Dated May 25, 2002.
English abstract of JP-A-10-59160.
English abstract of WO 96/16849, Jun. 6, 1996, equivalent to JP-T-11-500380.
English abstract of JP-A-11-115717.
German Official Office Action Dated Oct. 31, 2002.
English translation of German Official Office Action Dated Oct. 31, 2000.
English abstract of JP-A-09178169.
English abstract of JP-A 2000260226, equivalent to DE 199 41 481 A1.
English abstract of JP-A 0213661, equivalent to DE 198 35 881 A1.

* cited by examiner

BRAKE FLUID PRESSURE CONTROL DEVICE

CROSS-REFERENCE TO RELATED APPLICATIONS

This application is a Divisional of application Ser. No. 10/856,931 filed Jun. 1, 2004, which in turn is a Divisional of application Ser. No. 09/731,923, filed Dec. 8, 2000, now U.S. Pat. No. 6,761,418, issued Jul. 13, 2004 which claims priority of Japanese Patent Application No. 11-370507, filed on Dec. 27, 1999, the disclosures of which include the specification, drawings and abstract and are incorporated herein in their entirety.

BACKGROUND OF THE INVENTION

1. Field of the Invention

The invention relates to brake fluid pressure control devices including a plurality of fluid pressure control valves that control fluid pressures in a plurality of brakes.

2. Description of Related Art

Japanese Laid-Open Patent Application No. 7-277175 discloses a brake fluid pressure control device including: (1) a control device mainly composed of a computer, (2) a pump that pressurizes operating fluid by means of motive power, (3) fluid pressure control valves that operate in accordance with control signals supplied from the control device and capable of controlling fluid pressures in brakes based on a fluid pressure in the pump, (4) pump shut-off valves provided between the fluid pressure control valves and the pump and that are switched in accordance with control signals supplied from the control device between a communication state where the fluid pressure control valves communicate with the pump and a shut-off state where the fluid pressure control valves are shut off from the pump, and (5) signal lines connecting the fluid pressure control valves to the control device and signal lines connecting the pump shut-off valves to the control device.

In this brake fluid pressure control device, the fluid pressure control valves are provided on the side of front wheels and on the side of rear wheels respectively. The pump shut-off valves are provided between the front-wheel-side fluid pressure control valves and the pump, and between the rear-wheel-side fluid pressure control valves and the pump respectively. If an abnormal condition arises either on the side of the front wheels or on the side of the rear wheels, the pump shut-off valves provided on the side experiencing the abnormal condition are switched to a shut-off state in accordance with control signals from the control device. Consequently, the fluid pressure control valves are shut off from the pump, and the brakes are operated by operating fluid in a master cylinder.

However, the aforementioned publication does not disclose a fail-safe system of such a brake fluid pressure control device, for example, as a countermeasure against cases where connectors for the signal lines are disconnected or incorrectly connected (where an abnormally connected condition arises) and where electric energy cannot be supplied to the fluid pressure control valves, the pump shut-off valves and the pump.

SUMMARY OF THE INVENTION

The invention has been made in view of the aforementioned circumstances. It is an object of the invention to improve fail-safe performance during abnormal operation of an electric system and thereby enhance reliability of a brake fluid pressure control device.

In order to solve the aforementioned and/or other problems, a brake fluid pressure control device according to a first aspect of the invention includes a controller, a fluid pressure control unit that operates in accordance with a control signal supplied from the controller and having a plurality of fluid pressure control valves that control fluid pressures in a plurality of brakes for inhibiting rotations of a plurality of wheels, and a plurality of signal lines connecting the fluid pressure control valves to the controller. The signal lines are divided into a plurality of signal line groups. The signal lines of a first one of the signal line groups are connected between the controller and the fluid pressure control unit by a first connector, whereas the signal lines of a second one of the signal line groups are connected between the controller and the fluid pressure control unit by a second connector.

In the brake fluid pressure control device according to the first aspect of the invention, the signal lines connecting the controller to the fluid pressure control valves respectively are divided into signal line groups, each of which includes a separate connector between the controller and the fluid pressure control unit. The signal lines are not connected altogether by a single connector but are divided into a plurality of groups, which are respectively connected by separate connectors. Accordingly, even in the case where some of the connectors fall into an abnormally connected condition, for example, due to disconnection or inappropriate fitting, as long as the other connectors are normally connected, it is possible to supply control signals to the fluid pressure control valves via the signal lines connected by the connectors that are normally (correctly) connected. The fluid pressure control valves corresponding to the normally connected signal lines can be controlled, and fluid pressures in the brakes corresponding to those fluid pressure control valves can be controlled. Thus, if fail-safe performance during abnormal operation of the electric system (during abnormal operation of the control system) is improved, it is accordingly possible to enhance reliability of the brake fluid pressure control device.

The signal lines are divided into a plurality of signal line groups. The number of the groups is arbitrary. If the number of groups increases, the number of connectors increases. However, the number of fluid pressure control valves that become incapable of receiving control signals upon occurrence of an abnormally connected condition of one connector decreases. Therefore, it is desirable to determine the number of groups in consideration of the cost required for the connectors, the influence exerted upon emergence of an abnormally connected condition of the connectors, and the like. In general, it is adequate to divide the signal lines into two or three groups. However, it is also possible to divide them into four or more groups. The connectors may be provided on either or both of the controller and the fluid pressure control unit, or at a location between the controller and the fluid pressure control unit.

The brake fluid pressure control device operates according to the first aspect of the invention, as long as the signal lines are divided into a plurality of groups, each having its own connector. The invention is not intended to exclude the possibility of providing a plurality of controllers. It is also possible to respectively control the groups by means of separate controllers.

The brakes may respectively be provided in a front-left wheel, a front-right wheel, a rear-left wheel and/or a rear-right wheel. The brakes may be divided such that one or more signal lines connected to one or more fluid pressure control valves corresponding to the brakes respectively provided in the front-left wheel and the rear-right wheel and one or more signal lines connected to one or more fluid pressure control valves corresponding to the brakes respectively provided in the front-right wheel and the rear-left wheel belong to different signal line groups.

In such a brake fluid pressure control device, the signal lines are divided such that one or more signal lines connected to one or more fluid pressure control valves that control fluid pressures in brakes for diagonally located wheels belong to the same group. Accordingly, even in the case where one of the connectors falls into an abnormally connected condition, if the other connector is normally connected, fluid pressures in the brakes for a pair of diagonally located wheels are controlled. Because fluid pressures in the brakes for the diagonally located wheels are controlled, it is possible to inhibit a decline in braking stability of the vehicle.

Furthermore, the fluid pressure control unit may be constructed to include a connecting passage connecting at least either brake cylinders for the front-left wheel and the front-right wheel or brake cylinders for the rear-left wheel and the rear-right wheel and a communication state control valve provided in the connecting passage and switched in accordance with a control signal from the controller between a communication state where two brake cylinders communicate with each other and a shut-off state where the two brake cylinders are shut off from each other.

In such a construction, the brake cylinders for the left and right wheels on the side of at least one of the front wheels and the rear wheels can communicate with each other. Accordingly, the fluid pressure control valves corresponding to a pair of diagonally located brakes can be controlled. Also, if the brake cylinders for the left and right wheels on the side of at least one of the front wheels and the rear wheels communicate with each other, fluid pressures in the left and right brakes on the side where brake cylinders communicate with each other can be controlled in common through control of the controllable fluid pressure control valves.

For example, in the case where one of the two connectors falls into an abnormally connected condition and where the fluid pressure control valves for the front-right and rear-left wheels are controllable and the fluid pressure control valves for the front-left and rear-right wheels become uncontrollable respectively, if the left and right wheels communicate with each other on the side of the front wheels, fluid pressures in the two brakes for the front-left and front-right wheels can be controlled in common by controlling the fluid pressure control valves for the front-right wheel (and the rear-left wheel).

The brakes may respectively be provided in a front-left wheel, a front-right wheel, a rear-left wheel and/or a rear-right wheel. The brakes may be divided such that one or more signal lines connected to one or more fluid pressure control valves corresponding to the brakes respectively provided in the front-left wheel and the front-right wheel and one or more signal lines connected to one or more fluid pressure control valves corresponding to the brakes respectively provided in the rear-left wheel and the rear-right wheel belong to different signal line groups.

In such a brake fluid pressure control device, the signal lines for one or more fluid pressure control valves controlling fluid pressures in the brakes for the front-left and front-right wheels belong to the same group, and the signal lines for one or more fluid pressure control valves controlling fluid pressures in the brakes for the rear-left and rear-right wheels belong to the same group. Even if one of the two connectors falls into an abnormally connected condition, the brakes for the left and right wheels either on the side of the front wheels or on the side of the rear wheels can be controlled. Therefore, it is possible to inhibit a decline in braking stability.

Furthermore, the brake fluid pressure control device may further include a pressurizing device that pressurizes operating fluid by means of motive power, and the fluid pressure control valves may be constructed to control fluid pressures in the brakes based on a fluid pressure in the pressurizing device.

In this brake fluid pressure control device, fluid pressures in the brakes are controlled based on a fluid pressure in the pressurizing device through control of the fluid pressure control valves. Accordingly, it is possible to control fluid pressures in the brakes, for example, to a pressure different from a value determined by operation of the brake actuating member by the (vehicle) driver, and to generate fluid pressures in the brakes even if the braking operation has not been performed. For example, the pressurizing device may be a pump.

A brake fluid pressure control device according to a second aspect of the invention includes a controller, a plurality of operation state detectors that detect an operation state of a brake actuating member and that supply a detection signal to the controller, and a plurality of signal lines connecting the operation state detectors to the controller. Fluid pressures in a plurality of brakes are controlled based on at least one of a plurality of values detected by the operation state detectors. In the second aspect of the invention, the signal lines are divided into a plurality of signal line groups, with each group having its own connector between the controller and the operation state detector(s) of that group.

In the brake fluid pressure control device according to the second aspect of the invention, the signal lines through which detection signals are transmitted are divided into a plurality of the signal line groups, each of which has its own separate connector. Accordingly, even if some of the connectors fall into an abnormally connected condition, it is possible to supply the detection signals to the controller.

The operation state detectors may detect an operation state of the brake actuating member either directly or indirectly. For direct detection, it is possible to employ, for example, a stroke sensor that detects an operation stroke of the brake actuating member and an operation force sensor that detects an operation force applied to the brake actuating member. For indirect detection, it is possible to employ, for example, a master pressure sensor that detects a fluid pressure in a master cylinder where a fluid pressure corresponding to an operation force of the brake actuating member is generated.

In the first and second aspects of the invention, even if some of the connectors fall into an abnormally connected condition, the fluid pressure control valves can be controlled based on an operation state of the brake actuating member detected by the detectors. Fluid pressures in the brakes can be controlled to a level based on the detected operation state.

A brake fluid pressure control device according to a third aspect of the invention includes a plurality of fluid pressure control valves capable of controlling fluid pressures in a plurality of brakes that inhibit rotations of a plurality of wheels, and a power source that supplies electric energy to the fluid pressure control valves. The fluid pressure control valves are divided into a plurality of control valve groups, which are respectively connected to the power source by separate connectors.

In the third aspect of the invention, the fluid pressure control valves are divided into the control valve groups, which are respectively connected to the power source by the separate connectors. Accordingly, even if some of the connectors fall into an abnormally connected condition, electric energy can be supplied to the fluid pressure control valves connected to the other connectors so that the fluid pressure control valves can be operated. The brake fluid pressure control device according to the third aspect of the invention may include one, two or more power sources. In the case where two or more power sources are provided, they can be provided for the control valve groups respectively. However, this is not necessary.

The brake fluid pressure control device according to the first through third aspects can be divided such that the fluid pressure control valves provided in diagonally located wheels belong to the same group. Also, if the signal lines are divided and combined with the brake fluid pressure control valves respectively connected by a plurality of connectors, an additional advantage is derived from the invention.

Furthermore, the invention can also be applied to a connector that connects a plurality of detectors to a power source.

A brake fluid pressure control device according to a fourth aspect of the invention includes a fluid pressure control unit operated by electric energy and having a plurality of fluid pressure control valves that control fluid pressures in a plurality of brakes that inhibit rotations of a plurality of wheels, and an electric energy supply device including a plurality of power sources and that supplies electric energy to the fluid pressure control valves. In the fourth aspect of the invention, the fluid pressure control valves are divided into a plurality of control valve groups, and the electric energy supply device supplies electric energy from different power sources respectively for the control valve groups.

In the brake fluid pressure control device according to the fourth aspect of the invention, a plurality of fluid pressure control valves are divided into a plurality of control valve groups, which are respectively connected to the different power sources. Therefore, even if some of the power sources fall into an abnormal condition, electric energy can be supplied from the normal (correctly functioning) power sources to the fluid pressure control valves belonging to the control valve groups connected to those power sources, so that the fluid pressure control valves can be operated. In the fourth aspect of the invention, the drive system is divided into a plurality of systems.

The power sources may or may not include generators. Also, the power sources may or may not include accumulators such as batteries.

A brake fluid pressure control device according to a fifth aspect of the invention includes a fluid pressure control unit operated by electric energy and having a plurality of fluid pressure control valves that control fluid pressures in a plurality of brakes that inhibit rotations of a plurality of wheels, and an electric energy supply device including a plurality of power sources that supply electric energy to the fluid pressure control valves. In the brake fluid pressure control device according to the fifth aspect of the invention, the electric energy supply device supplies electric energy to at least one of the fluid pressure control valves from a plurality of power sources.

In the case where the fluid pressure control valves are connected to a plurality of power sources, even if some of the power sources fall into an abnormal condition, electric energy is supplied from the other power sources. Therefore, the fluid pressure control valves can be operated. Each of the power sources connected to one fluid pressure control valve may be provided either exclusively for the brake fluid pressure control device or in common with an engine control device and the like. As long as the brake fluid pressure control device can also operate during control by the engine control device, no trouble is caused. In other words, in the case where the power sources provided in common with the engine control device fall into an abnormal condition so that no more electric energy is supplied to the engine control device, the necessity to control fluid pressures in the brakes is not urgent. Therefore, even if no electric energy is supplied to the brake fluid pressure control device, no trouble is caused. Rated voltages of the power sources may be different from one another or identical to one another.

In the case where a plurality of power sources are connected to one fluid pressure control valve, electric energy may be supplied either simultaneously from the power sources or selectively from one of the power sources. In the case where electric energy is supplied selectively from one of the power sources, it is assumed that one of the power sources serves as a primary power source and that the other power sources serve as secondary power sources. In this case, although electric energy is normally supplied from the primary power source, it is supplied from the secondary power sources upon emergence of an abnormal condition in the primary power source. In some cases, one of the power sources is selected such that electric energy is regularly supplied every time braking operation is performed or every time a set period elapses.

The power sources may have different rated voltages.

At least one of the power sources may be a battery, and a battery state detector that detects a state of the battery may be provided. The state of the battery includes a charge amount, a degree of deterioration and the like. For example, a charge amount of the battery can be detected based on at least one of an output voltage of the battery and an accumulated value of amounts of current at the time of charge and discharge. The output voltage decreases with decreases in charge amount, and there is usually a certain relation between charge amounts and output voltages. A charge amount of the battery can be obtained based on an amount of current at the time of charge and an amount of current at the time of discharge.

A degree of deterioration can be detected based on an internal resistance and a temperature. For example, if the output voltage changes greatly with respect to an output current, the internal resistance is great. If the temperature becomes higher, the internal resistance apparently becomes smaller. Accordingly, if the internal resistance remains the same, it is possible to conclude that a high degree of deterioration results from a high temperature. A degree of deterioration can be detected based on an internal resistance and a temperature.

The type of the battery is not specifically limited. For example, it is possible to employ a lead battery, a nickel/hydrogen battery, a lithium ion battery and the like.

Each of the fluid pressure control valves may include a solenoid having a coil and a movable portion operated in accordance with a state of supply of electric energy to the coil, and the at least one solenoid of the fluid pressure control valves may have a plurality of coils connected to power lines of the power sources.

In such fluid pressure control valves, the solenoid includes the coils connected to the different power sources.

Thus, even if some of the power sources fall into an abnormal condition, it is possible to operate the movable portion and the fluid pressure control valves. It is possible to improve fail-safe performance during abnormal operation of the electric system and enhance reliability of the brake fluid pressure control device.

A plurality of coils are formed by winding lead wires connected to a plurality of power sources. The coils may be arranged either in series or in parallel. The coils may be provided either separately or integrally. In some cases, a plurality of lead wires are integrally wound to form a coil.

Furthermore, the brake fluid pressure control device may further include a pump device having a pump pressurizing and discharging operating fluid and a pump motor driving a pump by means of a driving force generated by electric energy. The fluid pressure control valves may be constructed to control fluid pressures in the brakes based on a fluid pressure in the pump device. The electric energy supply device may be constructed to supply electric energy to the pump motor independently from a plurality of power sources.

In such a brake fluid pressure control device, even if some of the power sources fall into an abnormal condition, the pump motor can be operated.

Furthermore, the pump motor may include a coil disposed in at least one of a stator and a rotor, and the pump motor may drive the pump by means of a driving force generated by supplying electric energy to the coil, and the at least one coil may be composed of a plurality of coil members connected to power lines of the power sources.

The type of the pump motor is not specifically limited. In many cases, however, a DC motor is used to drive the pump.

A brake fluid pressure control device according to a sixth aspect of the invention includes a plurality of operation state detectors that detect an operation state of a brake actuating member and become capable of detection through supply of electric energy, and an electric energy supply device including two or more power sources that supply electric energy to the operation state detectors. Fluid pressures in a plurality of brakes are controlled based on at least one of a plurality of values detected by the operation state detectors. The operation state detectors are divided into a plurality of detector groups, and the electric energy supply device supplies electric energy to the detector groups independently from different power sources.

In the brake fluid pressure control device according to the sixth aspect of the invention, electric energy is supplied to the detector groups independently from the different power sources. Thus, even if some of the power sources fall into an abnormal condition, electric energy can be supplied to the detectors connected to the power sources that operate normally. Thus, these detectors are capable of detection.

It is also possible to connect a plurality of power sources to a single detector.

In the first through sixth aspects of the invention, the fluid pressure control valves may be control valves that control fluid pressures in the brakes based on a fluid pressure in a pump that includes a pump pressurizing operating fluid and a pump motor operating the pump by means of a driving force generated by electric energy. The operation state detectors may include a fluid pressure detector that detects a fluid pressure in a fluid pressure source, which generates a fluid pressure corresponding to an operation force of the brake actuating member. The controller may output a control signal to the fluid pressure control valves based on a fluid pressure detected by the fluid pressure detector.

The fluid pressure source includes a master cylinder that generates fluid pressures by means of an operation force of the brake actuating member. In addition to the master cylinder, the fluid pressure source may also include a booster device that boosts a brake operating force and transmits the boosted brake operating force to the master cylinder, and a pressure-increasing device that increases a fluid pressure in the master cylinder. If the fluid pressure source includes a booster device or a pressure-increasing device, a fluid pressure corresponding to a brake operating force and higher than a fluid pressure caused by the operation force can be generated.

Furthermore, it is possible to employ a construction in which the brakes include front-wheel-side brakes and rear-wheel-side brakes, and in which the pump device and the fluid pressure source are connected to brake cylinders for the front-wheel-side brakes, the fluid pressure source is not connected to brake cylinders for the rear-wheel-side brakes, and the pump device is connected to the brake cylinders for the rear-wheel-side brakes.

A switching device that communicates between the front-wheel-side brake cylinder and the pump device is disposed therebetween, and a switching device that communicates between the front-wheel-side brake cylinder and the fluid pressure source is disposed therebetween. On the other hand, since the pump device is always connected to the rear-wheel-side brake cylinders, there is no need to provide switching devices.

Furthermore, the fluid pressure control valve may include a pressure-increasing control valve provided between a brake cylinder of a brake and the pump device and a pressure-reducing control valve provided between the brake cylinder and a low-pressure source. The pressure-reducing control valve provided on the side of the front wheels is normally closed, and the pressure-reducing control valve provided on the side of the rear wheels is normally closed.

Because the fluid pressure source is not connected to the rear-wheel-side brake cylinders, it is necessary to return operating fluid in the brake cylinders to the low-pressure source, for example, by keeping the pressure-decreasing control valves open for a set period in the case of cancellation of braking operation. However, if it is impossible to return all the operating fluid in the brake cylinders to the low-pressure source, the occurrence of dragging is likely. In order to avoid this, it is desirable to design the pressure-reducing control valves as normally open valves. On the other hand, the fluid pressure source is connected to the front-wheel-side brake cylinders. Thus, if the brake cylinders are in communication with the fluid pressure source, it is possible to return operating fluid in the brake cylinders to the fluid pressure source upon cancellation of braking operation.

In the case where the pressure-reducing control valves are normally open, they need to be closed immediately upon emergence of the necessity to operate the brakes. If they are closed with delay, an undesirable lag in braking effect is caused. In this case, a braking force generated on the side of the rear wheels is smaller than a braking force generated on the side of the front wheels. A lag in braking effect on the side of the rear wheels has less impact on the vehicle than it does on the side of the front wheels.

In view of the aforementioned circumstances, a technique in which brake cylinders are connected only to a pump device and pressure-reducing control valves are normally open can more suitably be put into practice on the side of the rear wheels than on the side of the front wheels.

A technique in which rear-wheel-side pressure-reducing control valves are normally open can be applied not only to the aforementioned brake control devices but also to brake control devices of other types. For example, it is applicable to a brake fluid pressure control device in which a fluid pressure source is also connected to brake cylinders for rear wheels.

BRIEF DESCRIPTION OF THE DRAWINGS

The foregoing and further objects, features and advantages of the invention will become apparent from the following description of preferred embodiments with reference to the accompanying drawings, in which like reference numerals are used to represent like elements and wherein.

DETAILED DESCRIPTION OF PREFERRED EMBODIMENTS

Hereinafter, a brake fluid pressure control device according to embodiments of the invention will be described in detail with reference to the drawings.

Figure 1:
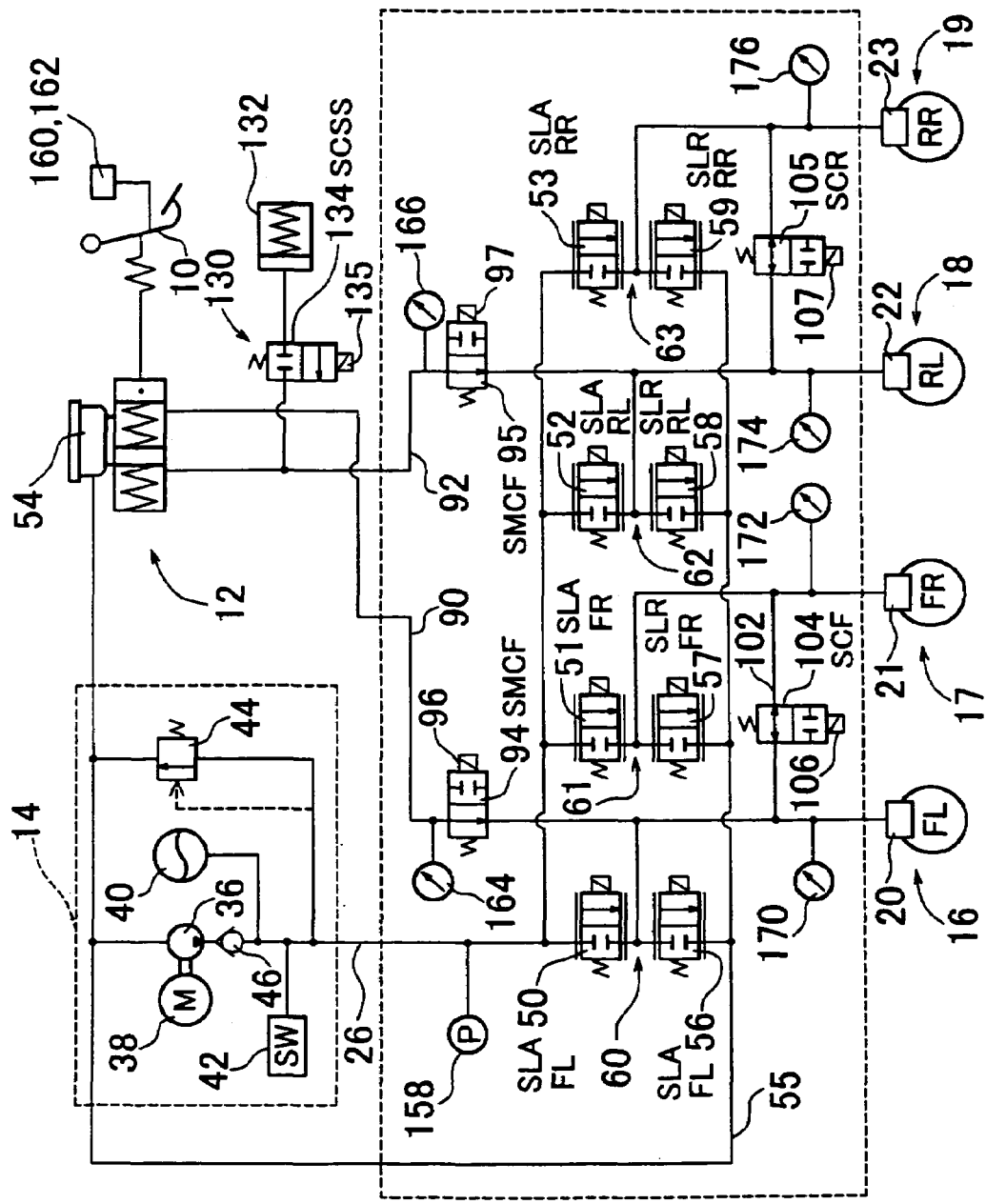
FIG. 1 is a circuit diagram of a brake device including a brake fluid pressure control device according to one embodiment of the invention.

FIG. 1 shows a brake device including one embodiment of the brake fluid pressure control device. The brake device includes a brake pedal 10 serving as a brake actuating member, a master cylinder 12 including two pressurizing chambers, a power-operated pump device 14, brakes 16, 17, 18 and 19 provided in front-left, front-right, rear-left and rear-right wheels respectively, and the like. Brake cylinders 20, 21, 22 and 23 of the four brakes 16–19 are connected to the pump device 14 via a fluid passage 26. Operating fluid in the pump device 14 is supplied to the brake cylinders 20–23 via the fluid passage 26.

The pump device 14 includes a pump motor 38 for driving a pump 36. High-pressure operating fluid discharged from the pump 36 is accumulated in an accumulator 40. A pressure switch 42 detects whether or not the fluid pressure of the operating fluid accumulated in the accumulator 40 is within a set range. A relief valve 44 prevents a fluid pressure of the operating fluid discharged from the pump 36 from becoming excessively high. In addition, a check valve 46 is provided between the pump 36 and the accumulator 40 to prevent the operating fluid in the accumulator 40 from flowing back to the pump 36.

Pressure-increasing linear valves 50, 51, 52 and 53 are provided in the fluid passage 26. Pressure-reducing linear valves 56, 57, 58 and 59 are provided in a fluid passage 55 connecting the brake cylinders 20–23 to a master reservoir 54. The pressure-increasing linear valves 50–53 and the pressure-reducing linear valves 56–59 constitute linear valve devices 60, 61, 62 and 63 respectively.

Figure 2:
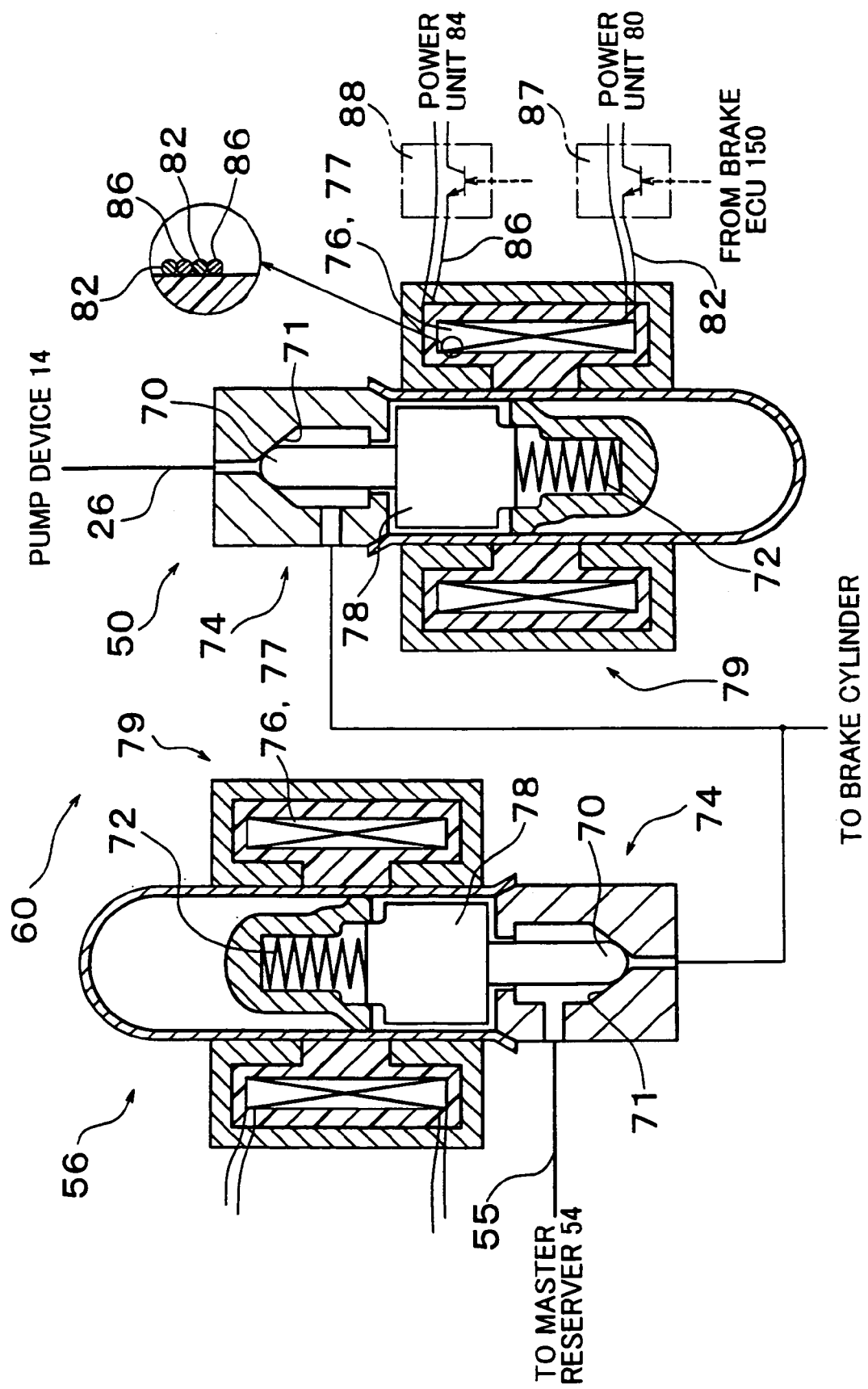
FIG. 2 shows a linear valve device included in the brake fluid pressure control device.

Because the linear valve devices 60-63 are structurally identical to one another, the description will be made only as to the linear valve device 60. That is, the description of the linear valve devices 61–63 will be omitted. As shown in FIG. 2, the linear valve device 60 includes the pressure-increasing linear valve 50 and the pressure-reducing linear valve 56. The pressure-increasing linear valve 50 includes a seating valve 74 and a solenoid 79. The seating valve 74 includes a valve body 70, a valve seat 71 and a spring 72. The solenoid 79 includes coils 76, 77 and a movable portion 78 which is moved in accordance with a current supplied to the coils 76, 77.

In the case where no current is being supplied to the coils 76, 77 in the seating valve 74, an urging force of the spring 72 is applied in a direction that urges the valve body 70 into contact with the valve seat 71, and a differential pressure operation force corresponding to a differential pressure across the seating valve 74 is applied in a direction that tends to move the valve body 70 away from the valve seat 71. As long as the urging force of the spring 72 is greater than the differential pressure operation force, the valve body 70 is kept closed and thus remains in contact with the valve seat 71. If the differential pressure operation force becomes greater than the spring 72 urging force, the valve body 70 is opened and thus moves away from the valve seat 71. Thus, the pressure-increasing linear valve 50 is normally closed. If the coils 76, 77 are supplied with a current, an electromagnetic driving force corresponding to the current is applied to the movable portion 78 in a direction that causes the valve body 70 to move away from the valve seat 71. In the seating valve 74, the urging force of the spring 72 (in the direction in which the valve body 70 comes into contact with the valve seat 71) and the differential pressure operation force and the electromagnetic driving force (in the direction in which the valve body 70 moves away from the valve seat 71) are applied. In accordance with a relation among the urging force, the differential pressure operation force and the electromagnetic driving force, the seating valve 74 is opened or closed. If the electromagnetic driving force becomes greater due to an increase in current supplied to the coils 76, 77, the seating valve 74 is opened even when the differential pressure operation force is small. Thus, by controlling a current supplied to the coils 76, 77 (electric energy supplied to the coils 76, 77), the brake cylinder fluid pressure is controlled. As will be described later, in this embodiment, a target brake cylinder fluid pressure is determined such that a braking force required by the driver is obtained. Also, a current supplied to the coils 76, 77 is determined such that an actual brake cylinder fluid pressure becomes equal to the target fluid pressure.

As described above, in this embodiment, the solenoid 78 includes the two coils 76, 77. One of the coils 76 is formed by winding a lead wire 82 connected to a power unit 80, and the other coil 77 is formed by winding a lead wire 86 connected to a power unit 84. As shown in FIG. 2, the two lead wires 82, 86 are integrally wound to form the coils 76, 77.

The lead wire 82 is provided with a control circuit 87, and the lead wire 86 is provided with a control circuit 88. Both the control circuits 87, 88 include a transistor that serves as a breakerless switch, and are supplied with a current required for the coils by controlling connection and disconnection of the transistor. In this embodiment, control is performed such that the sum of electric energy (current) supplied simultaneously to the coils 76, 77 from the power units 80, 84 becomes equal to a supply current capable of realizing the aforementioned target fluid pressure.

Although the pressure-reducing linear valve 56 has the same structure, a differential pressure operation force corresponding to a difference between a fluid pressure in the brake cylinder 20 and a fluid pressure in the master reservoir 54 is applied to the pressure-reducing linear valve 56.

Figure 5:
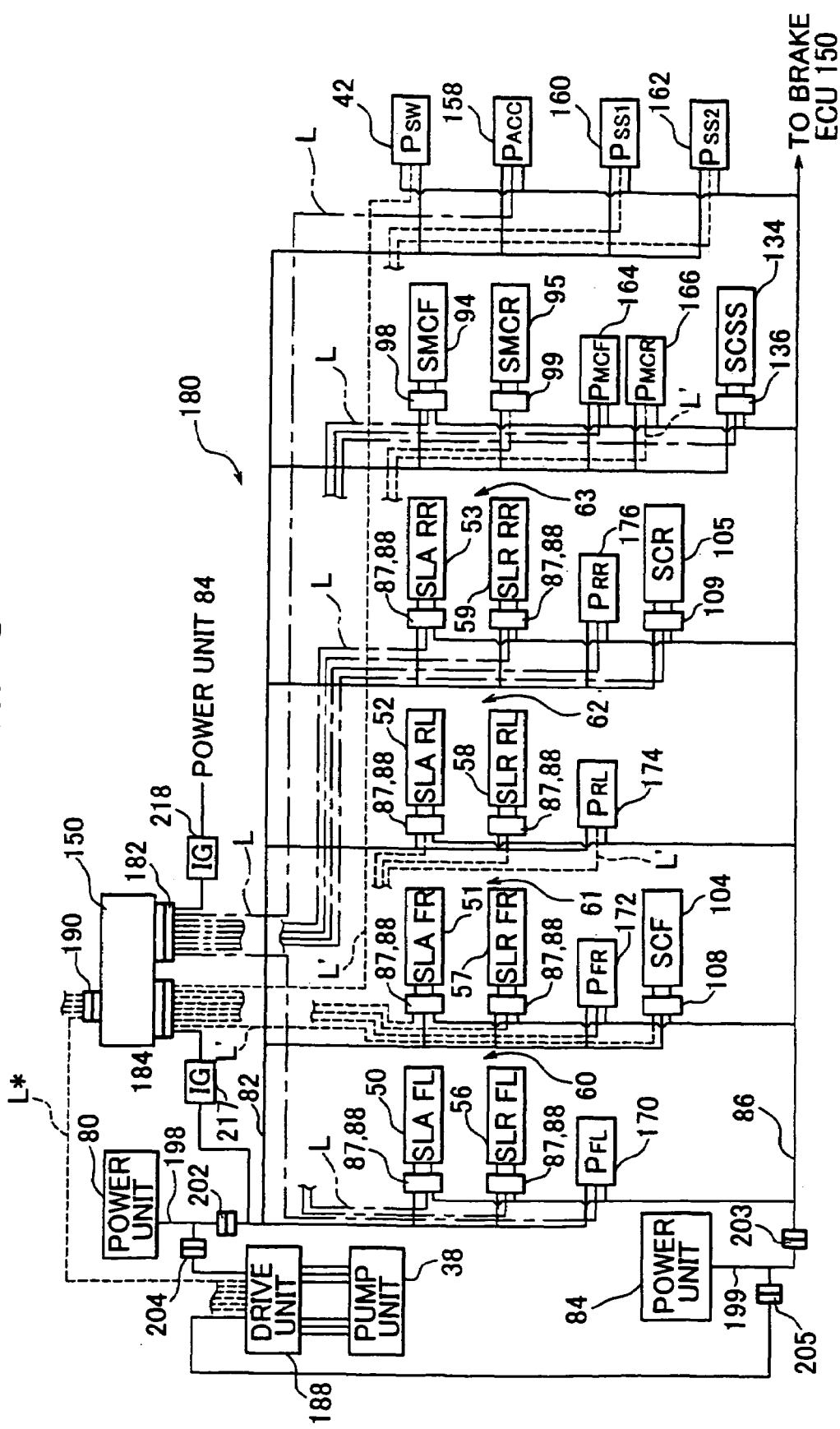
FIG. 5 shows a control system (signal lines) of the brake fluid pressure control device.

Returning to FIG. 1, the brake cylinders 20, 22 are connected to the two pressurizing chambers of the master cylinder 12 via fluid passages 90, 92 respectively. The fluid passages 90, 92 extend across master shut-off valves 94, 95 respectively. The master shut-off valves 94, 95 are activated through ON/OFF control of the energy supplied to coils 96, 97. While no electric energy is being supplied (OFF), the master shut-off valves 94, 95 are kept open. Upon supply of electric energy (ON), they are closed. The master shut-off valves 94, 95 are constructed in the same manner as the aforementioned linear valves. The coil 96 is formed of two lead wires, which are provided with control circuits 98a, 98b respectively. The coil 97 is formed of two lead wires, which are provided with control circuits 99a, 99b respectively. Hereinafter, the two control circuits 98a, 98b will collectively be referred to as a control circuit 98, and circuits 99a, 99b will be referred to as control circuit 99. Instead of the control circuits 98a, 98b (and 99a, 99b), the control circuit 98 (and 99) is shown in FIG. 5. This will hold true for later-described control circuits. ON/OFF control of the current supplied to the coils 96, 97 is performed through control of the control circuits 98, 99. Thereby the master shut-off valves 94, 95 are opened or closed.

The two brake cylinders 20, 21 are connected to each other by a connecting passage 102, and the two brake cylinders 22, 23 are connected by each other by a connecting passage 103. The connecting passages 102, 103 are provided with a front-wheel-side communication valve 104 and a rear-wheel-side communication valve 105 respectively. While no electric energy is being supplied to coils 106, 107 (OFF), the front-wheel-side communication valve 104 and the rear-wheel-side communication valve 105 are kept open. Upon supply of electric energy (ON), they are closed. The current supplied to the coils 106, 107 is controlled through control of control circuits 108, 109 (see FIG. 5).

Thus, one front-wheel-side brake cylinder is connected to one of the two pressurizing chambers of the master cylinder 12, and one rear-wheel-side brake cylinder is connected to the other pressurizing chamber. The two front-wheel-side brake cylinders are connected by the connecting passage 102, and the two rear-wheel-side brake cylinders are connected by the connecting passage 103. Therefore, if the master shut-off valves 94, 95 come into communication with each other and if the front-wheel-side communication valve 104 and the rear-wheel-side communication valve 105 come into communication with each other, all the brakes 16–19 are actuated by the operating fluid in the master cylinder 12.

A stroke simulator device 130 is provided in the fluid passage 92. The stroke simulator device 130 includes a stroke simulator 132 and a stroke simulator switching valve 134. Through ON/OFF control of electric energy supplied to a coil 135 of the stroke simulator switching valve 134, the stroke simulator 132 is switched between its state of communication with the master cylinder 12 and its shut-off state. In this embodiment, if the brakes 16–19 are actuated by the operating fluid from the pump device 14, electric energy is supplied to the coil 135 (ON) and the stroke simulator 132 is thereby switched to its communication state. If the brakes 16–19 are actuated by the operating fluid from the master cylinder 12, no electric energy is supplied to the coil 135 (OFF) and the stroke simulator 132 is thereby switched to its shut-off state. The current supplied to the coil 135 is controlled by a control circuit 136 (see FIG. 5).

First of all, a control system of the brake device will be described. In this embodiment, the linear valve devices 60–63 are controlled by a brake ECU (Electronic Control Unit) 150 mainly composed of a computer. A pressure switch (PSW) 42, an accumulator pressure sensor (PACC) 158 for detecting an accumulator pressure upstream of the linear valve devices, two stroke sensors (PSS1, PSS2) 160, 162 for detecting an operation stroke of the brake pedal 10, master pressure sensors (PMCF, PMCR) 164, 166 for detecting fluid pressures in the two pressurizing chambers respectively, brake fluid pressure sensors (PFL, PFR, PRL, PRR) 170, 172, 174 and 176 for detecting fluid pressures in the brake cylinders 20–23 respectively, and the like are connected to the brake ECU 150. Also, the control circuits 87, 88 for controlling a current supplied to the coils 76, 77 of the pressure-increasing linear valves (SLAFL, SLAFR, SLARL, SLARR) 50–53, the control circuits 87, 88 for the coils 76, 77 of the pressure-reducing linear valves (SLRFE, SLRFR, SLRRL, SLRRR) 56–59, the control circuits 98, 99 for performing ON/OFF control of the coils 96, 97 of the master shut-off valves (SMCF, SMCR) 94, 95, the control circuits 108, 109 for the coils 106, 107 of the front-wheel-side and rear-wheel-side communication valves (SCF, SCR) 104, 105, the control circuit 136 for the coil 135 of the stroke simulator switching valve (SCSS) 134, and the like are connected to the brake ECU 150. The aforementioned switches, the sensors 42, 158, 160 and the like, and the electromagnetic valves 50, 56, 94, 95 and the like constitute a fluid pressure control unit 180. Signal lines connected to the fluid pressure control unit 180 are connected to the brake ECU 150 via connectors 182, 184.

In this embodiment, braking effect control is performed during normal braking. A braking force required by the driver is calculated based on detected values of the stroke sensors 160, 162 and the master pressure sensors 164, 166. A target fluid pressure corresponding to the required braking force is calculated. Then, the current supplied to the coils 76, 77 of the linear valve devices 60–63 is controlled via the control circuits 87, 88 such that actual brake fluid pressures detected by the brake fluid pressure sensors 170, 172, 174 and 176 become close to the target fluid pressure.

Referring to FIG. 5, a signal line L* for transmitting a control signal to a drive circuit 188 for controlling the pump motor 38 is connected to the brake ECU 150 via a connector 190. The pump motor 38 is controlled such that the accumulator pressure is maintained within a predetermined set range.

The signal lines connected by the connector 182 are signal lines L indicated by alternate long and short dash lines. To be more specific, these signal lines include control signal lines L connected to the control circuits 87, 88 of the linear valve device 60 provided for the front-left wheel, the control circuits 87, 88 of the linear valve device 63 provided for the rear-right wheel, the control circuit 109 of the rear-wheel-side communication valve 105, the stroke simulator switching valve 134 and the control circuits 136, 98 for the master shut-off valve 94, and detection signal lines L connected to the brake fluid pressure sensors 170, 176, the accumulator pressure sensor 158 and the master pressure sensor 164. The control signal lines L transmit control signals from the brake ECU 150 to the control circuits and the like, and the detection signal lines L transmit detection signals indicative of values detected by detectors to the brake ECU 150.

The signal lines connected by the connector 184 are signal lines L' indicated by broken lines. To be more specific, these signal lines include control signal lines L' leading to the linear valve device 61 provided for the front-right wheel, the linear valve device 62 provided for the rear-left wheel, the front-wheel-side communication valve 104 and the control circuit 99 of the master shut-off valve 95, and detection signal lines L' for the pressure switch 42, the master pressure sensor 166, the brake fluid pressure sensors 172, 174 and the stroke sensors 160, 162.

Thus, the signal lines of the fluid pressure control unit 180 are divided into a signal line group including the signal lines connected to the linear valve device 60 and the brake fluid pressure sensor 170 and the signal lines connected to the linear valve device 63 provided for the rear-right wheel and the brake fluid pressure sensor 176, and a signal line group including the signal lines connected to the linear valve device 61 provided for the front-right wheel and the brake fluid pressure sensor 172 and the signal lines connected to the linear valve device 62 provided for the rear-left wheel and the brake fluid pressure sensor 174. The master pressure sensors 164, 166 serve as a sensor for detecting an operation state of the brake pedal 10. The master pressure sensor 164 belongs to one of the signal line groups, and the master pressure sensor 166 belongs to the other signal line group.

Accordingly, if one of the two connectors 182, 184 is normally (correctly) connected, the signal lines connected thereby supply the brake ECU 150 with detected values indicative of an operation state of the brake. Also, it becomes possible to output control signals to the linear valve device for controlling fluid pressures in some of the brakes and the like. If at least one of the two connectors 182, 184 is normally connected, brake fluid pressures can be controlled based on an operation state of the brakes.

Signal lines for controlling two diagonally located brakes belong to one of the signal line groups. Therefore, even if one of the two connectors 182, 184 falls into an abnormally connected condition, fluid pressures in the two diagonally located brakes can be controlled. Thus, it is possible to inhibit a decline in braking stability of the vehicle.

Furthermore, the signal lines connected to the two stroke sensors 160, 162 belong to the signal line group connected by the connector 184. Thus, if the connector 184 is disconnected, the precision in controlling fluid pressures somewhat deteriorates in comparison with the case where the connector 182 is disconnected. However, the braking force obtained in this case is closer to a braking force required by the driver in comparison with the case where the master cylinder 12 is in communication.

For example, in the case where the connector 182 is abnormally connected and where the connector 184 is normally connected, the linear valve device 60 for the front-left wheel and the linear valve device 63 for the rear-right wheel are uncontrollable, but the linear valve device 61 for the front-right wheel and the linear valve device 62 for the rear-left wheel are controllable. The front-wheel-side communication valve (SCF) 104 and the master shut-off valve (SMCR) 95 are also controllable. Upon supply of electric energy to the coils 106, 97, the front-wheel-side communication valve 104 and the master shut-off valve 95 are closed. If supply of electric energy to the coils 107, 96 is stopped, the rear-wheel-side communication valve (SCR) 105 and the master shut-off valve (SMCF) 94 are opened.

As a result, the brake cylinder 20 for the front-left wheel comes into communication with the master cylinder 12, and the brake cylinder 21 for the front-right wheel is shut off from the brake cylinder 20 for the front-left wheel. Operating fluid in the master cylinder 12 is supplied to the brake cylinder 20, and a fluid pressure in the brake cylinder 21 is controlled through control of the linear valve device 61. The brake cylinders 22, 23 for the rear-left and rear-right wheels come into communication with each other while being shut off from the master cylinder 12. Fluid pressures in the brake cylinders 22, 23 are made equal to each other and controlled in common through control of the linear valve device 62. The fluid pressures in the two brake cylinders 22, 23 are detected in common by the brake fluid pressure sensor 174. This control can be referred to as common fluid pressure control.

Thus, even if the connector 182 falls into an abnormally connected condition, only a brake for one of the wheels is actuated by operating fluid in the master cylinder 12. Fluid pressures in the brakes for the other three wheels can be controlled by operating fluid in the pump device 14. That is, not all the brakes for the four wheels are actuated by operating fluid in the master cylinder. This makes it possible to enhance controllability of fluid pressures and inhibit a decrease in braking force. Thus, it is possible to improve fail-safe performance during abnormal operation of the control system and enhance reliability of the brake fluid pressure control device.

In this case, target brake fluid pressures are determined based on values detected by the two stroke sensors 160, 162 and a value detected by the master pressure sensor 166. Because supply of electric energy to the coil 135 is stopped, the stroke simulator switching valve 134 is closed. In this case, since the brake cylinder 20 for the front-left wheel comes into communication with the master cylinder, the stroke of the brake pedal 10 operated by the driver is prevented from becoming almost equal to zero.

On the contrary, in the case where the connector 184 is abnormally connected and where the connector 182 is normally connected, the linear valve device 60 for the front-left wheel and the linear valve device 63 for the rear-right wheel are controllable, and the rear-wheel-side communication valve 105 and the master shut-off valve 94 are controllable. The brake cylinder 22 for the rear-left wheel comes into communication with the master cylinder 12, and fluid pressures in the brake cylinders for the other three wheels are controlled through control of the linear valve devices 60, 63. In this case, target brake fluid pressures are determined based on a value detected by the master pressure sensor 166. The pump motor 38 is controlled based on a value detected by the accumulator pressure sensor 158. Because the control circuit 136 for the stroke simulator switching valve 134 is controllable, the stroke simulator switching valve 134 is kept open. By keeping the stroke simulator switching valve 134 open, it becomes possible to inhibit a change in a state of the brake operated by the driver and alleviate a sense of incongruity. In this case, since the master shut-off valve 95 comes again into communication, the stroke simulator switching valve 134 may be closed.

There is a case where an abnormally connected condition of the connector 190 makes it impossible to transmit a control signal to the drive circuit 188 of the pump motor 38. Even in this case, as long as a sufficient amount of high-pressure operating fluid is accumulated in the accumulator 40, brake fluid pressure control can be continued.

Figure 3:
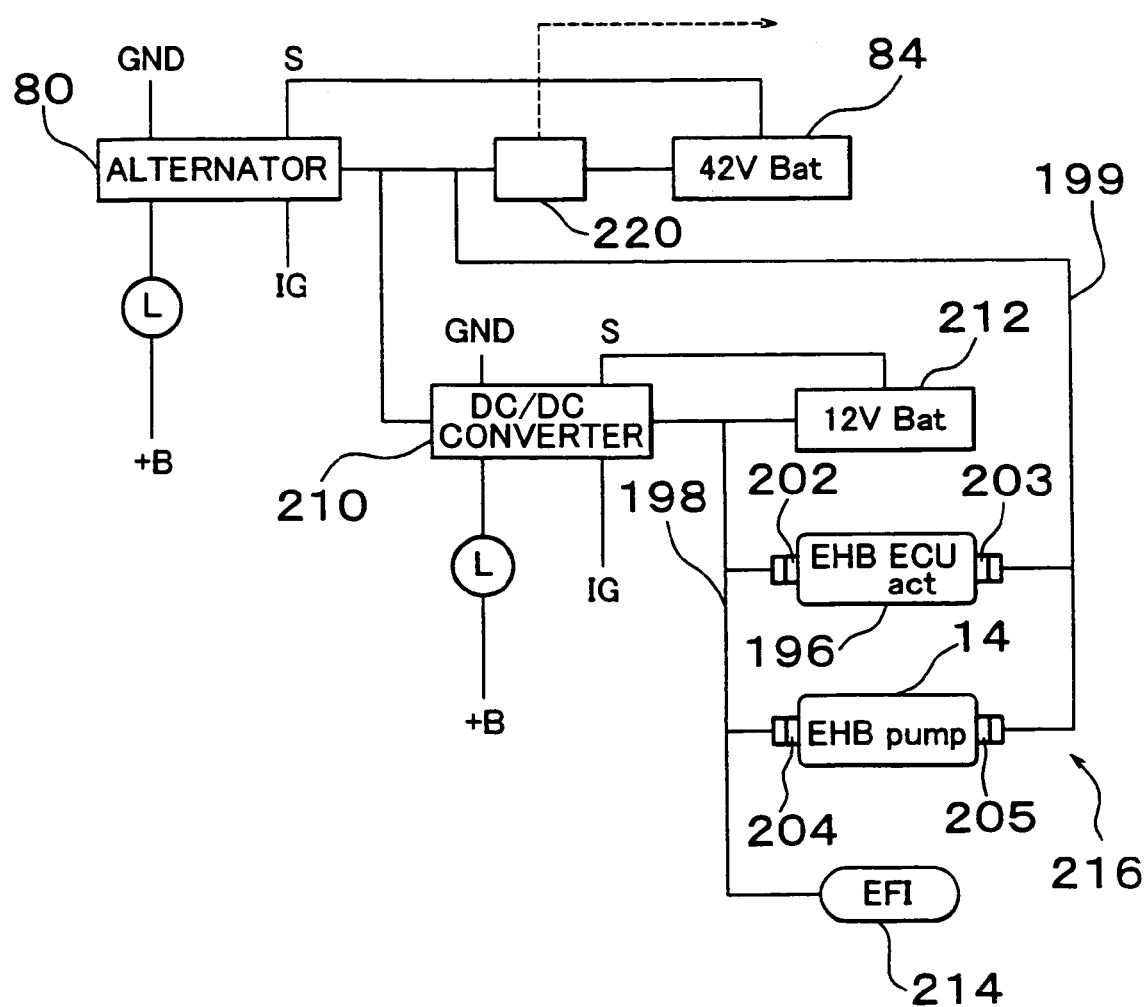
FIG. 3 shows a drive system (a power unit) of the brake fluid pressure control device.
Figure 4:
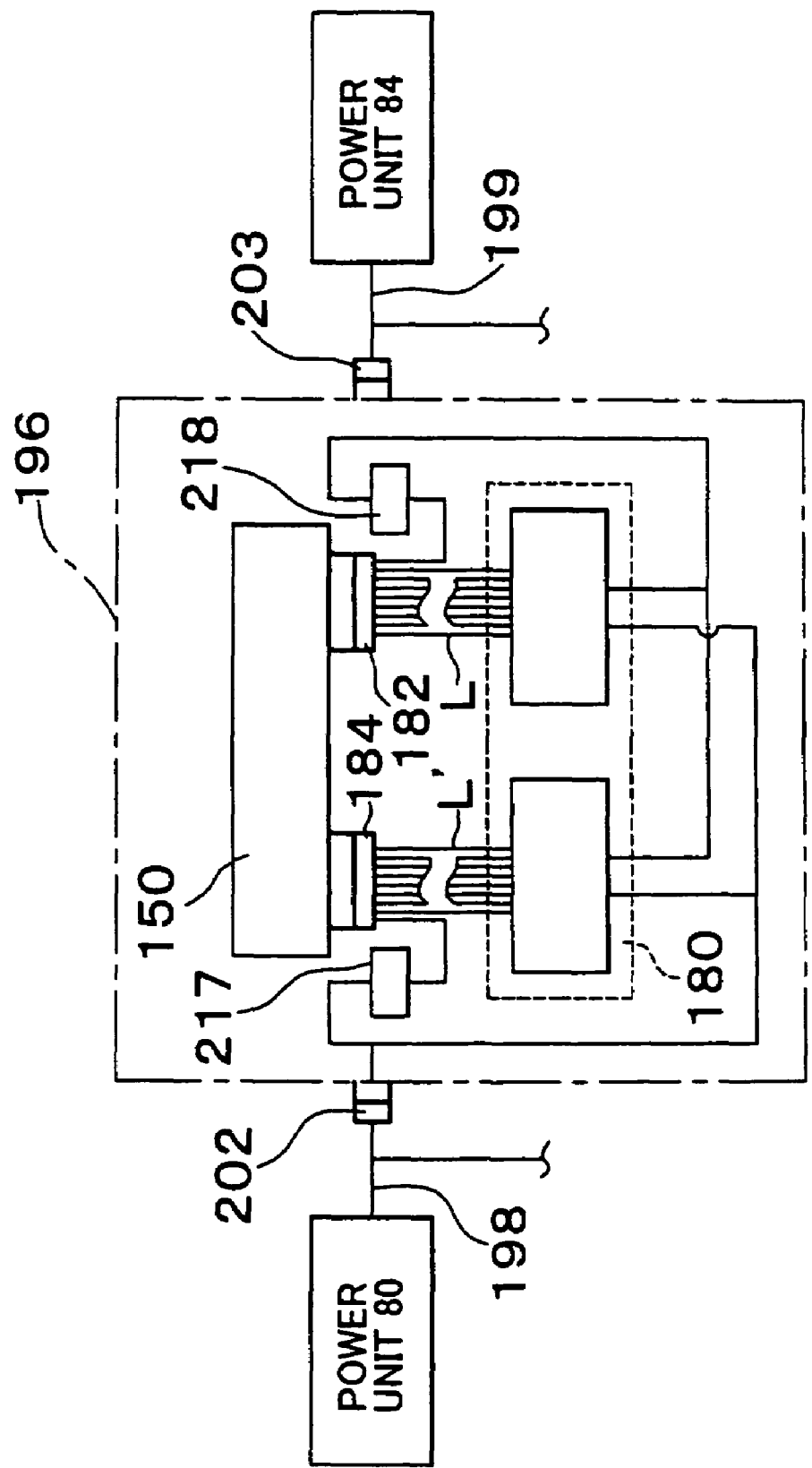
FIG. 4 is a conceptual view of the entire electric system of the brake fluid pressure control device.

Next, the drive system will be described. In this embodiment, as shown in FIGS. 3–5, the two power units 80, 84, which serve as a source of electric energy, are connected to the pump device 14 and to a fluid-pressure-control electric loading device 196 including the fluid pressure control unit 180 and the brake ECU 150. Power lines 198, 199 of the power units 80, 84 are connected to the fluid pressure control electrical loading device 196 via connectors 202, 203 respectively. The power lines 198, 199 are connected to the pump device 14 via connectors 204, 205 respectively. It is not necessary to connect both the power units 80, 84 to the pump device 14. The pump motor 38 can operate at a relatively low voltage. Therefore, even if output voltages of the power units have fallen, the pump motor 38 can be actuated. As long as the pump device 14 is connected to the power unit 80, no trouble is caused. The fluid-pressure-control electric loading device 196 and the pump device 14 can collectively be referred to as a brake electric loading device.

The power unit 80 includes a generator, a generator control circuit, a computer for controlling the control circuit, and the like. The generator generates electric energy by means of a drive source for driving a vehicle equipped with a brake device. In this embodiment, the generator is an alternator that rotates in accordance with rotation of an engine (not shown). Although the output voltage of the alternator is substantially constant (e.g. the rated voltage is 14V), it changes in accordance with an engine speed and the like. In this embodiment, the power unit 84 includes a 42V-battery and a control device for controlling the charging and discharging of the battery. The power unit 84 is charged with electric energy generated in the alternator.

A terminal S shown in FIG. 3 is a connection terminal of the power lines for operating the computer, the generator control circuit and the like. In this embodiment, electric energy is supplied from the power unit 84 to control the power unit 80. Also, information indicative of a state of an ignition switch is supplied to the computer. Furthermore, a battery lamp L is lighted when a battery B starts operating abnormally.

A voltage converter 210 is connected to the power unit 80. The voltage converter 210 includes a transmitter, a control circuit (a DC/DC converter) including a plurality of switching elements, a computer for controlling the control circuit, and the like. The computer controls the control circuit, whereby the voltage of electric energy supplied to the voltage converter 210 is changed (reduced) to a predetermined voltage (12V in this embodiment). The voltage converter 210 also has the function of keeping the output voltage constant.

A 12V-battery 212, the fluid-pressure-control electric loading device 196, the pump device 14, and an electric loading device (an electric energy consumption device) 216 such as an engine control device 214 and the like are connected to the voltage converter 210. The 12V-battery 212 is charged with electric energy output from the voltage converter 210. This electric energy is supplied to the electric loading device 216. The 12V-battery 212 is provided in common with the fluid-pressure-control electric loading device 196, the pump device 14 and the engine control device 214. In the case where the voltage supplied from the voltage converter 210 has fallen due to abnormality in the power unit 80 and the voltage converter 210 and the like, if a large amount of electric energy has been consumed in the electric loading device 216, electric energy is supplied from the 12V-battery 212.

The power unit 84 is provided with a battery state detector 220 for detecting a state of the battery. The battery state detector 220 includes a pressure sensor for detecting an output voltage, a temperature sensor for detecting a temperature, a current sensor for detecting a current, and the like. A charge amount is detected based on at least one of an output voltage and an accumulated value of amounts of current at the time of charge and discharge. Because there is already known a relation between charge amounts and output voltages, it is possible to detect a charge amount based on this relation. A charge amount can be detected based on an accumulated value of amounts of current at the time of charge and discharge. Furthermore, it is possible to precisely detect a charge amount based on both an accumulated value of amounts of current at the time of charge and discharge and an output voltage.

A degree of deterioration of the battery is detected based on an internal resistance and a temperature thereof. Because there is already known a relation among degrees of deterioration, internal resistances and temperatures, it is possible to detect a degree of deterioration based on this relation. The internal resistance increases with increases in voltage drop amount with respect to the output voltage. The internal resistance also decreases with increases in temperature. Provided that the internal resistance remains the same, the degree of deterioration increases with increases in temperature. A degree of deterioration can be detected based on these relations.

In this embodiment, if the degree of deterioration has reached a predetermined set degree, it is judged that the power unit 84 is in abnormal operation. Then a warning indicative of the necessity to replace the battery is issued. If the set degree is set to a relatively high degree (a state of deterioration that has not gone too far), the battery is replaced in a state where supply of electric energy is still possible. Thus, it becomes possible to reliably supply electric energy from the battery. It is possible to use batteries with a small capacity and thus reduce the overall weight of the vehicle.

The fluid-pressure-control electric loading device 196 is supplied with electric energy by the two power units 80, 84. The power unit 80 is connected to the brake ECU 150 via the connector 184 and an ignition switch 217, and the power unit 84 is connected to the brake ECU 150 via the connector 182 and an ignition switch 218. If the ignition switches 217, 218 are switched ON, the brake ECU 150 is supplied with electric energy. As shown in FIG. 2, the coils 76, 77 are formed by winding the lead wires 76, 77 connected to the two power lines 198, 199 (see FIG. 4) respectively. In the fluid pressure control unit 180, the coils 96, 97, 106, 107, 135 of the respective electromagnetic valves are formed in the same manner as the coils 76, 77. If the two power devices 80, 84 are in normal operation, electric energy in the form of current is simultaneously supplied therefrom so that the respective electromagnetic valves are actuated. Thus, the voltage of electric energy supplied via the lead wire 82 is different from the voltage of electric energy supplied via the lead wire 86. The voltage of electric energy supplied via the lead wire 82 is 12V, and the voltage of electric energy supplied via the lead wire 86 is 42V. The lead wires 82, 86 are adapted to 12V and 42V respectively.

In this embodiment, the control circuits for the respective coils are controlled such that the sum of amounts of current supplied from the power units 80, 84 becomes equal to a desired current. Thus, if the respective electromagnetic valves are actuated by electric energy simultaneously supplied from the two power units 80, 84, it is accordingly possible to reduce a load applied to the lead wires constituting the coils and to prolong their life span. Also in this respect, it is possible to enhance reliability of the brake fluid pressure control device.

Even if one of the two power units 80, 84 starts operating abnormally, electric energy is supplied from the other power unit. Therefore, the electromagnetic valves can be actuated. In this case, the control circuits are controlled such that desired electric energy is supplied from a power unit that is in normal operation.

Figure 6:
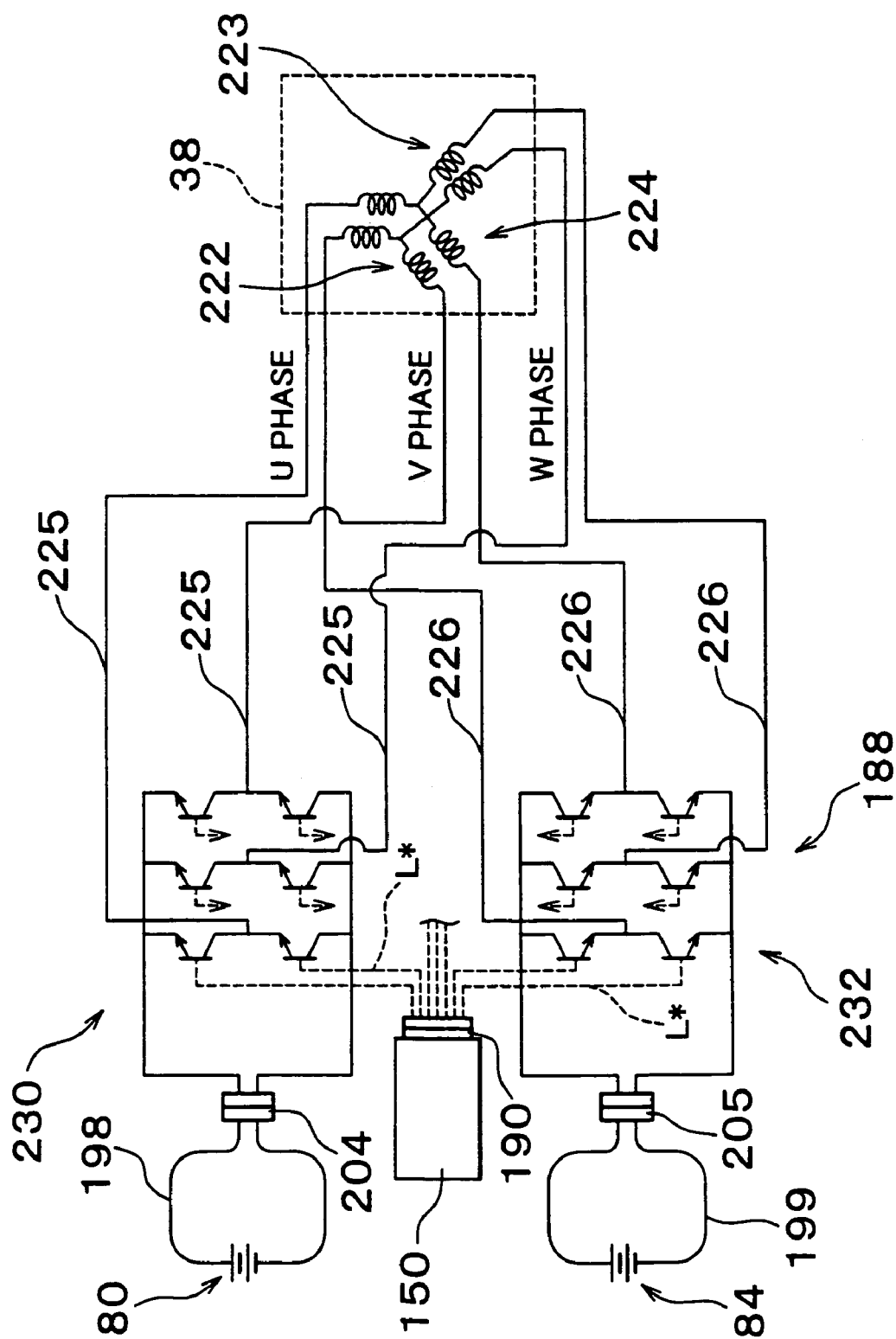
FIG. 6 is a conceptual view of a pump motor included in the brake fluid pressure control device.

The same holds true for the pump motor 38. FIG. 6 shows a case where the pump motor 38 is a brushless DC motor. Each of three-phase coils 222, 223 and 224 provided in a stator is formed by winding lead wires 225, 226 connected to the two power lines 198, 199. As for the coils 222, 223 and 224, the two lead wires 225, 226 may be wound integrally to form a double coil or may be wound separately to form two coils.

The drive circuit 188 is also provided with two switching control circuits 230, 232. An operation state of the pump motor 38 is controlled through control of the two control circuits 230, 232. If both the power units 80, 84 are in normal operation, the pump motor 38 is actuated by being simultaneously supplied with electric energy from both of them. If one of the power units 80, 84 starts operating abnormally, the pump motor 38 is actuated by electric energy supplied from the other power unit. As is the case with operation of the electromagnetic valves, even if one of the power units 80, 84 starts operating abnormally, the pump unit 38 can be actuated by electric energy supplied from the other power unit.

Furthermore, the same holds true for the respective detection devices. Although not shown, a fluid pressure sensor of a diaphragm type includes a diaphragm to which a pressure to be detected is applied and a bridge circuit for detecting a degree of deformation of the diaphragm. The fluid pressure sensor is provided with two bridge circuits which are connected to the power units 80, 84 respectively. The two bridge circuits are constantly supplied with electric energy from the power units 80, 84 respectively.

It is also possible to connect the two power units 80, 84 to one bridge circuit. In this case, electric energy is supplied from the power unit 84 whose output voltage is high. However, for example, in the case where the output voltage of the power unit 84 has dropped, electric energy is supplied from both the power units 80, 84 or from only the power unit 80. A switch device may be provided between the fluid pressure sensor and the two power units 80, 84 to selectively supply electric energy from one of the power units. For example, every time the brake is operated, electric energy is (alternately) supplied from one of the two power units.

A stroke sensor optically detects a rotational angle of the brake pedal 10 relative to a vehicle-body-side member. The stroke sensor includes a rotational angle detecting portion and a calculating portion. The rotational angle detecting portion includes a light-emitting body and a light-receiving body of the stroke sensor. The calculating portion is mainly composed of a computer for detecting a rotational angle based on a light-receiving state in the light-receiving body and detecting a stroke. The two power units 80, 84 are connected to at least one of the rotational angle detecting portion and the calculating portion of the stroke sensor.

Thus, according to this embodiment, even if one of the power units 80, 84 starts operating abnormally, the pump motor 38, the respective electromagnetic valves, the sensors and the like can be reliably supplied with electric energy. Even if one of the connectors 202, 203 falls into an abnormally connected condition, or even if one of the connectors 204, 205 falls into an abnormally connected condition, it is possible to supply electric energy to the fluid-pressure-control electric loading device 196 and to the pump device 14. It is possible to improve fail-safe performance when the drive system starts operating abnormally. It is also possible to enhance reliability of the brake fluid pressure control device.

In this embodiment, the stroke sensors 160, 162, the master pressure sensors 164, 166 and the like constitute an operation state detector. The power units 80, 84, the power lines 198, 199 and the like constitute an electric energy supply device.

The signal lines for connecting the brake ECU 150 to the fluid pressure control unit 180 can be divided in a manner different from the aforementioned embodiment. In the case where the signal lines for the linear valve devices 60–63 can be divided into two groups, even if one of the connectors 182, 184 starts operating abnormally, fluid pressures in some of the brakes can be controlled. It is not necessary to divide the signal lines into two groups. In other words, the signal lines can be divided into three or more groups. Furthermore, it is also possible to provide a signal line for each of the two stroke sensors 160, 162. It is not necessary to provide the connectors on the side of the brake ECU 150. The connectors may be provided on the side of the fluid pressure control unit 180. Alternatively, while some of the connectors may be provided on the side of the brake ECU 150, the other connectors may be provided on the side of the fluid pressure control unit 180. The connectors may also be provided between the brake ECU 150 and the fluid pressure control unit 180.

Figure 7:
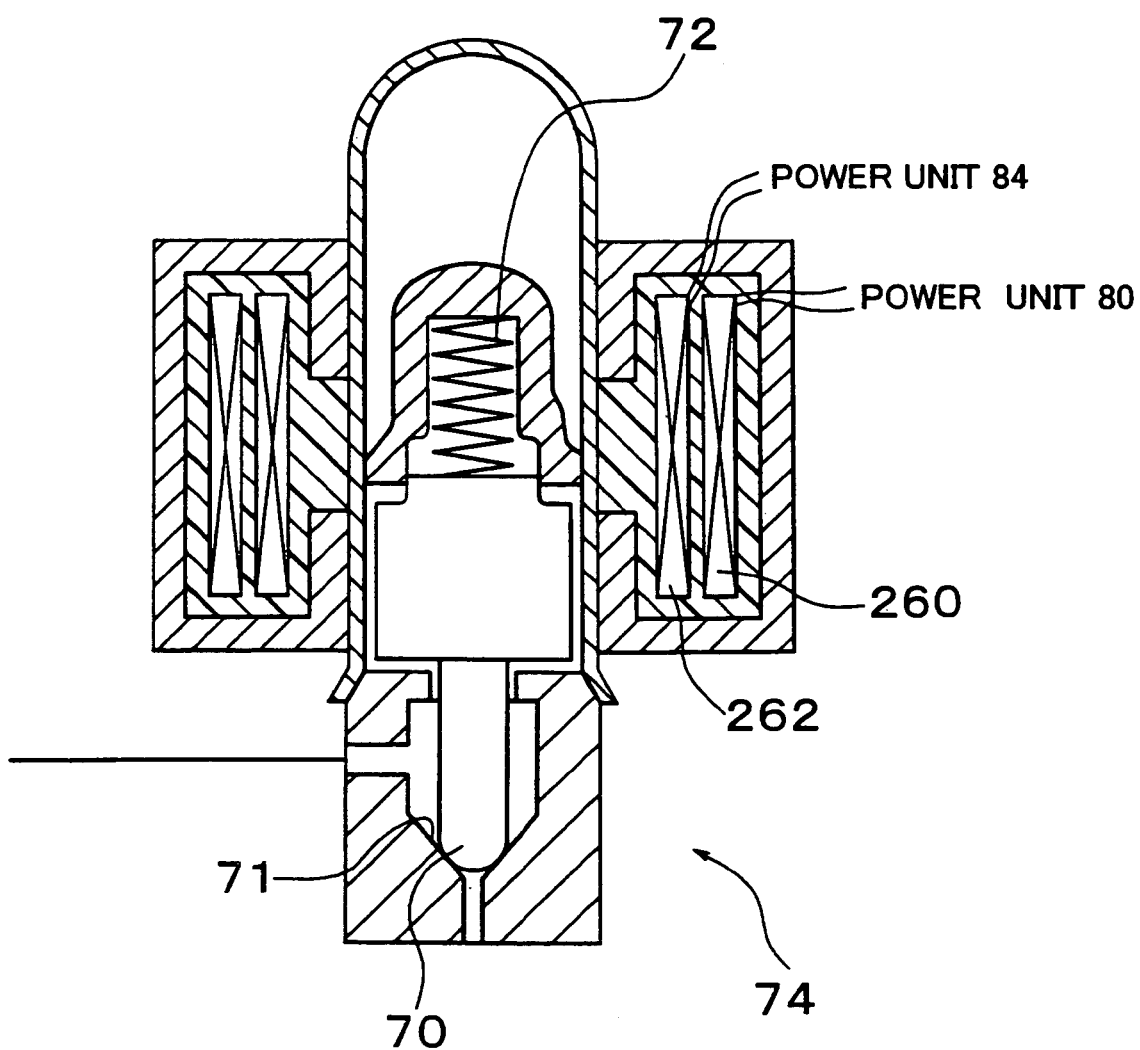
FIG. 7 shows a linear valve included in a brake fluid pressure control device according to another embodiment of the invention.
Figure 8:
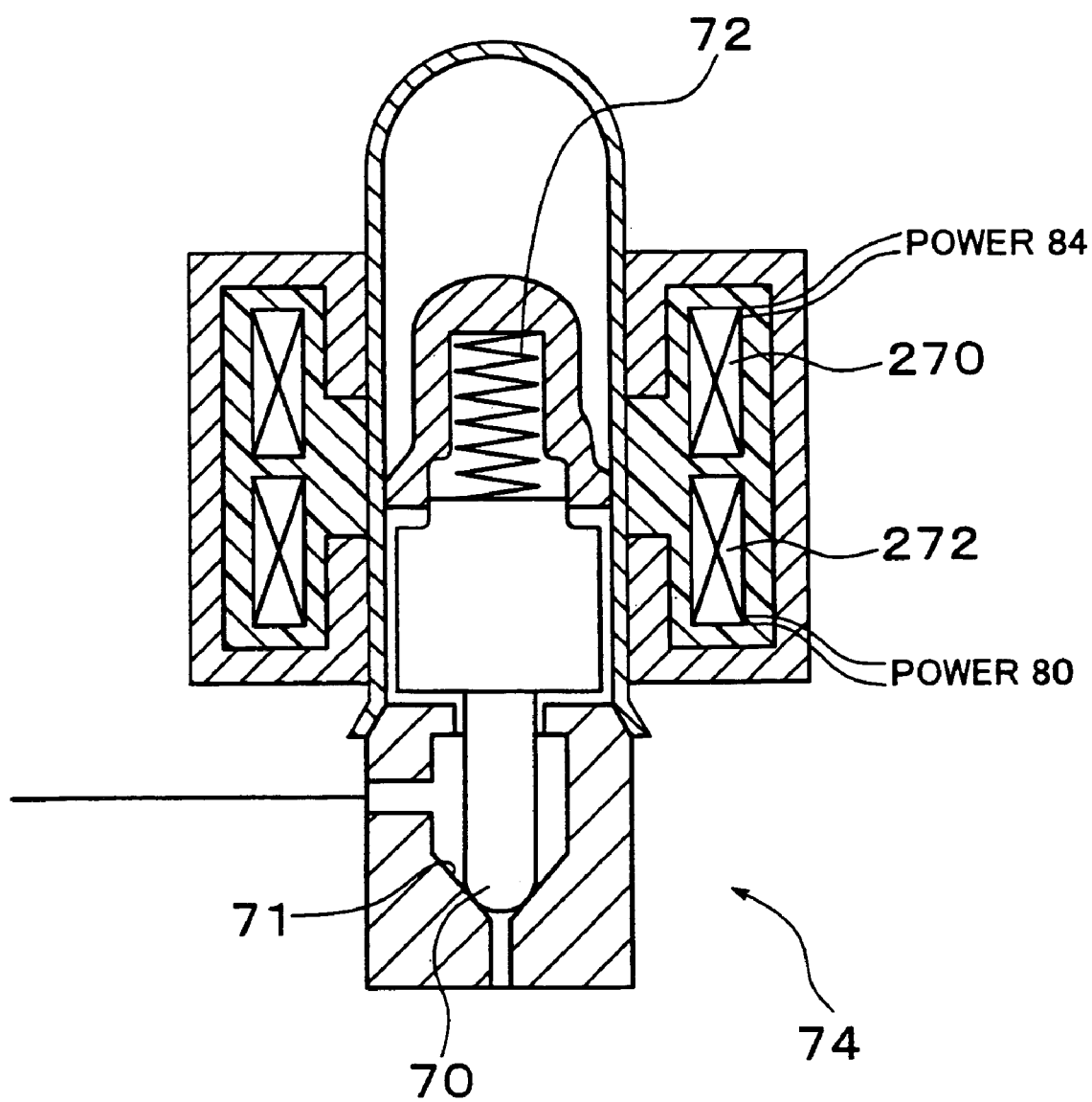
FIG. 8 shows a linear valve included in a brake fluid pressure control device according to still another embodiment of the invention.

Furthermore, in the aforementioned embodiment, the coils 76, 77 of the linear valve device are integrally formed by winding the two lead wires 82, 86. However, two separate coils may be formed by separately winding the two lead wires 82, 86. The two coils may be coils 260, 262 disposed in parallel as shown in FIG. 7 or coils 270, 272 disposed in series as shown in FIG. 8.

Figure 9:
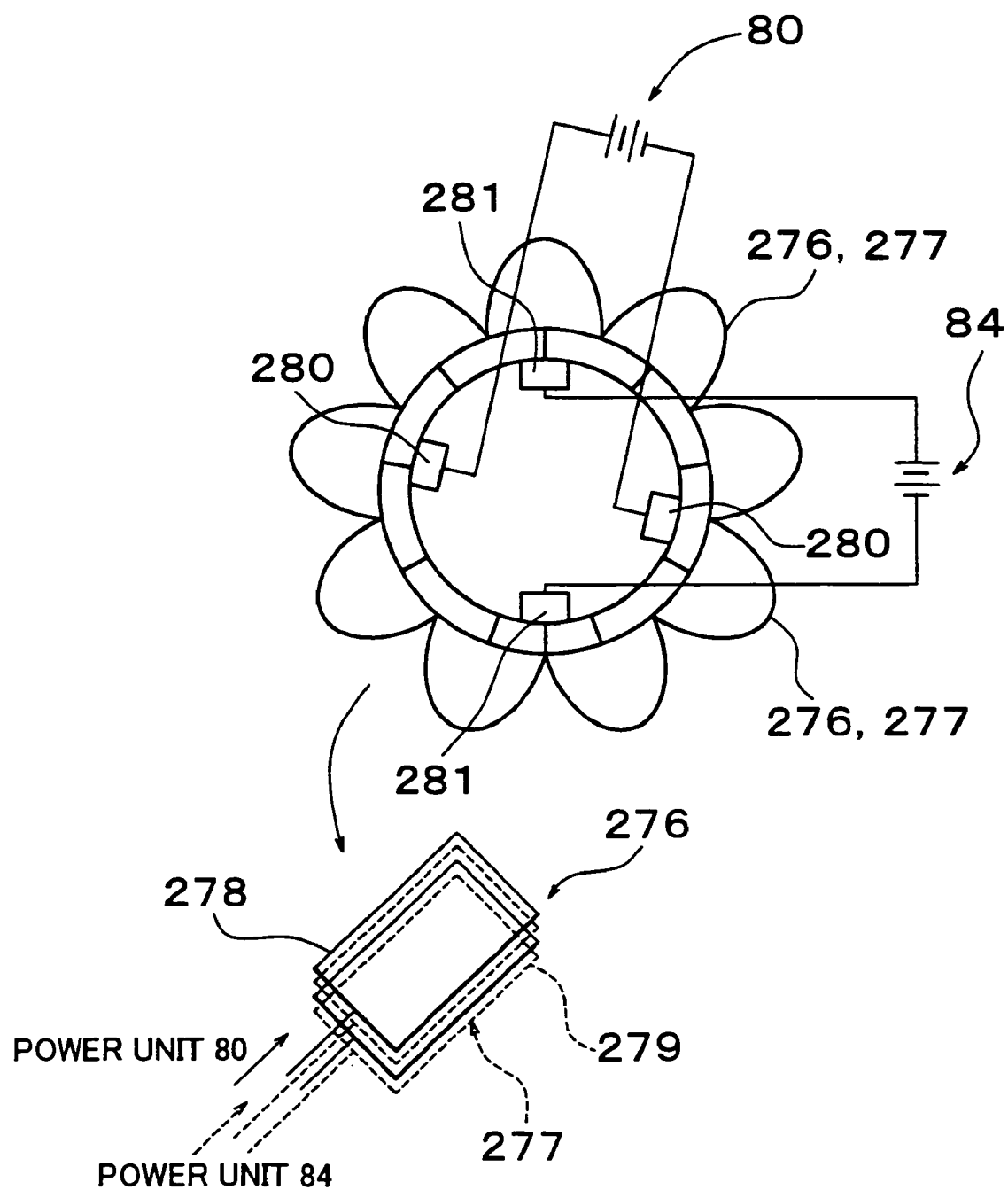
FIG. 9 shows a pump motor included in the brake fluid pressure control device according to another embodiment of the invention.

Any kind of motor can be used as the pump motor 38. For example, as shown in FIG. 9, the rotor may be a brush-equipped DC motor including coils. In this case, coils 276, 277 formed in the rotor may be formed by winding lead wires 278, 279 connected to the power units 80, 84. Brushes 280, 281 are provided for the power units 80, 84 respectively.

In the case of a brush-equipped DC motor, not only the rotor but also the stator includes coils. A magnetic field is formed by supplying electric energy to field coils provided on the side of the stator. The field coils 282, 284 provided on the side of the stator are also formed by winding the two lead wires 286, 288 connected to the two power units 80, 84.

Figure 10:
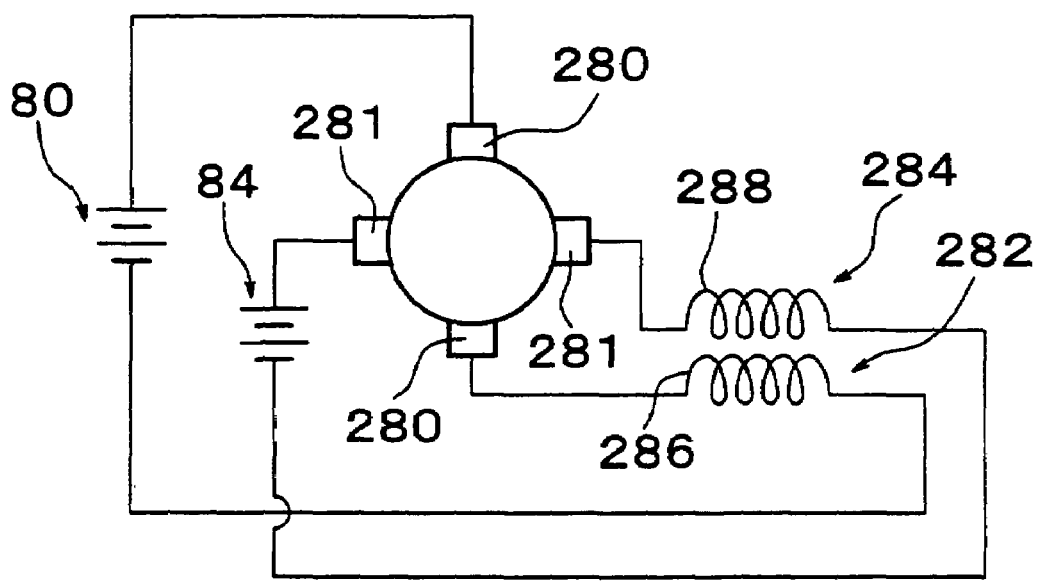
FIG. 10 shows a pump motor included in the brake fluid pressure control device according to still another embodiment of the invention.
Figure 11:
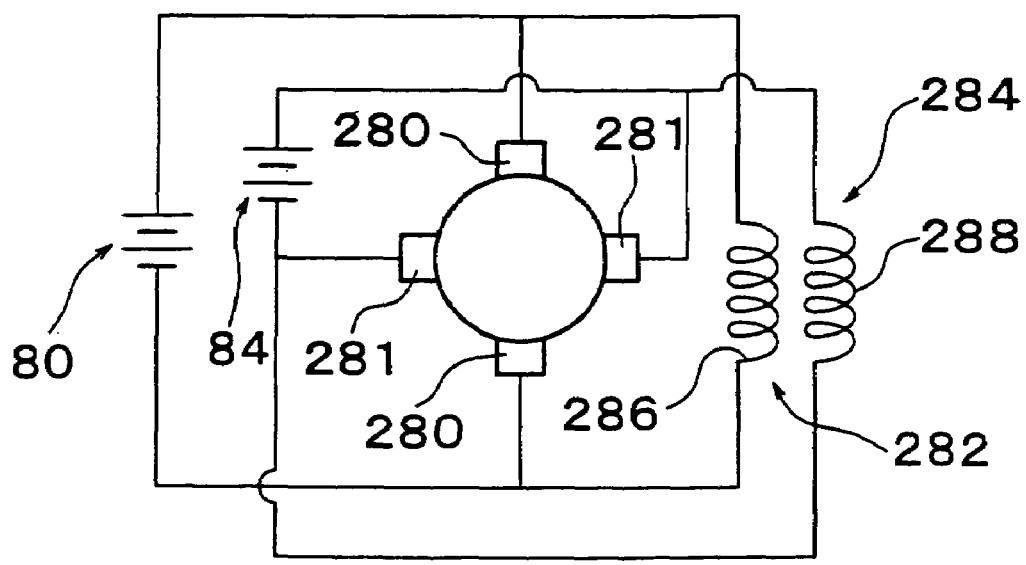
FIG. 11 shows the pump motor included in the brake fluid pressure control device according to still another embodiment of the invention.

The field coils 282, 284 may be provided in series with respect to the coils 276, 277 provided in the rotor as shown in FIG. 10 or in parallel therewith as shown in FIG. 11.

It is not necessary to form the coils of the pump motor 38 by two lead wires connected to the power units 80, 84. Even in the case where the pump motor 38 is inoperable, if high-pressure operating fluid is accumulated in the accumulator 40, brake fluid pressures can be controlled by means of the operating fluid. In addition, the same holds true for the detection devices. That is, it is not necessary to supply electric energy from the two power units 80, 84. As long as at least one of a plurality of detection devices is capable of detection, no trouble is caused.

Furthermore, in the aforementioned embodiment, the two power units 80, 84 are connected to the fluid pressure control unit 180, which is simultaneously supplied with electric energy from both power units. However, it is not necessary to simultaneously supply electric energy from the two power units 80, 84. A switch device may be provided between the power unit 80 and the fluid pressure control unit 180, and another switch device may be provided between the power unit 84 and the fluid pressure control unit 180. In this case, it is possible to selectively supply electric energy from one of the two power units 80, 84 by controlling the switch devices.

For example, the power units 80, 84 can serve as primary and secondary power sources respectively. That is, electric energy is normally supplied from the primary power source. If the primary power source starts operating abnormally, electric energy is supplied from the secondary power source. It is also possible to alternately select one of the two power units 80, 84 every time the brake is operated or every time a set time period elapses. In addition, it is also possible to switch the power unit for supplying electric energy upon fulfillment of a predetermined condition. In any case, the number of times of operation of the control circuits can be reduced, and their life span can be prolonged. It is also possible to select the power unit 80 and the power unit 84 at intervals of a short period. Furthermore, the 42V-battery of the power unit 84 may be charged with electric energy generated by a generator other than the alternator of the power unit 80.

Figure 12:
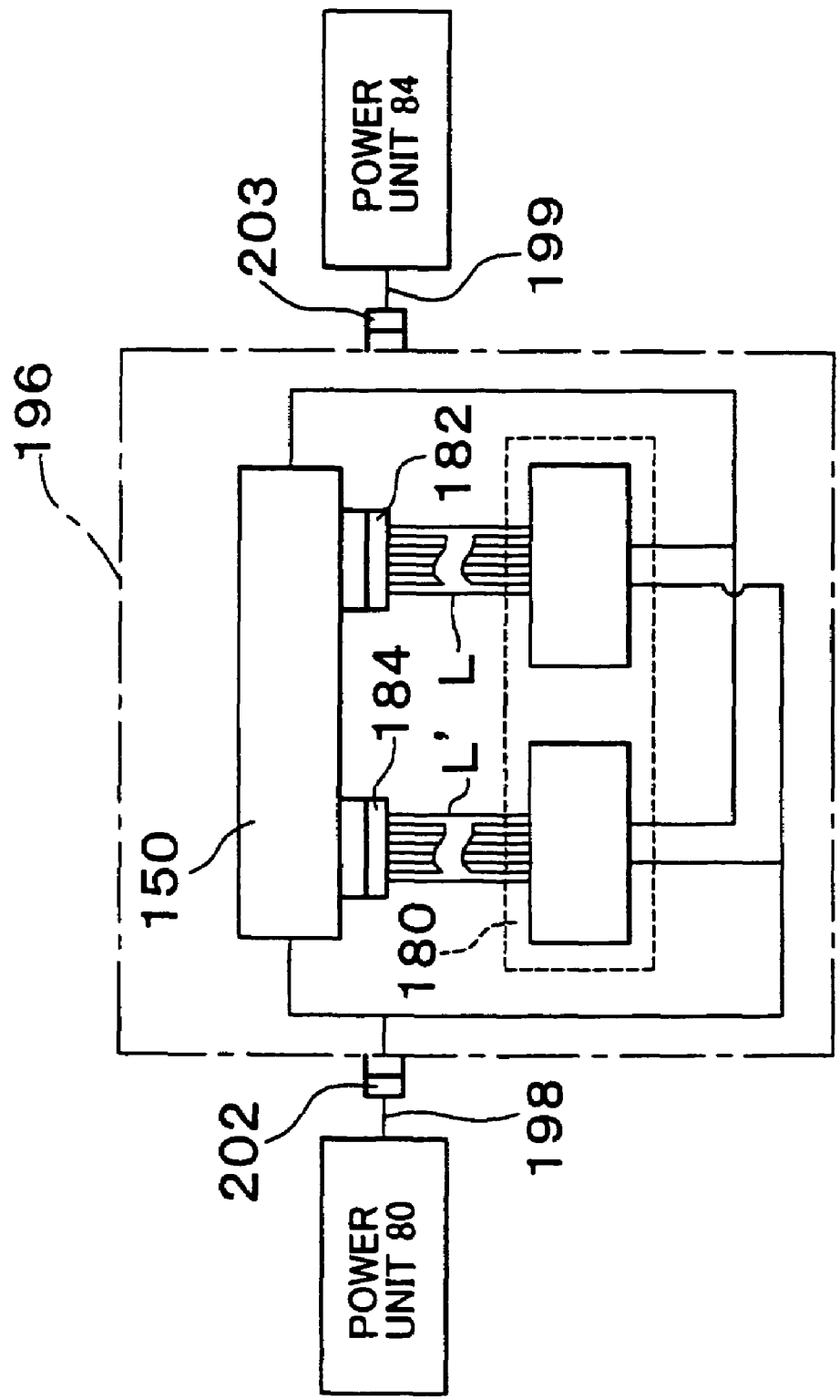
FIG. 12 is a conceptual view of an electric system of the brake fluid pressure control device according to another embodiment of the invention.

In addition, the power units 80, 84 may be connected to the fluid-pressure-control electric loading device 196 in a manner different from the aforementioned embodiment. For example, as shown in FIG. 12, the power units 80, 84 can be connected to the brake ECU 150 without using the connectors 182, 184.

Figure 13:
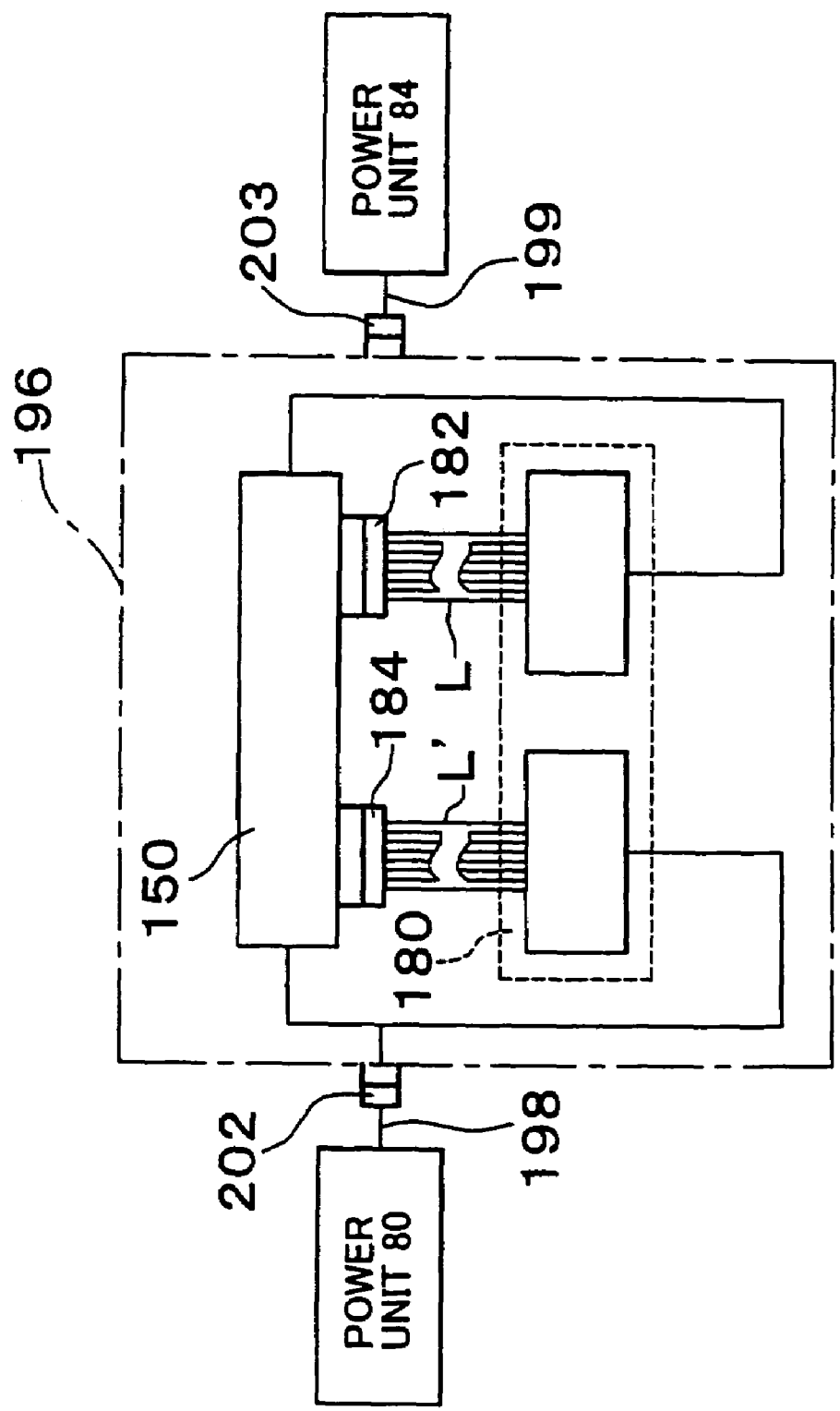
FIG. 13 is a conceptual view of an electric system of the brake fluid pressure control device according to still another embodiment of the invention.

As shown in FIG. 13, the coils, sensors and the like included in the fluid pressure control unit 180 may be divided into two groups so that the power unit 80 is connected to one of the groups and that the power unit 84 is connected to the other group. In this case, although it is desirable to divide them in the same manner as the signal lines, this is not necessary. In this case, there is no need to double the coils. Also in this embodiment, even if one of the connectors 202, 203 for connecting the power units 80, 84 to the fluid-pressure-control electric loading device 196 starts operating abnormally, fluid pressures in some of the brakes can be controlled.

Figure 14:
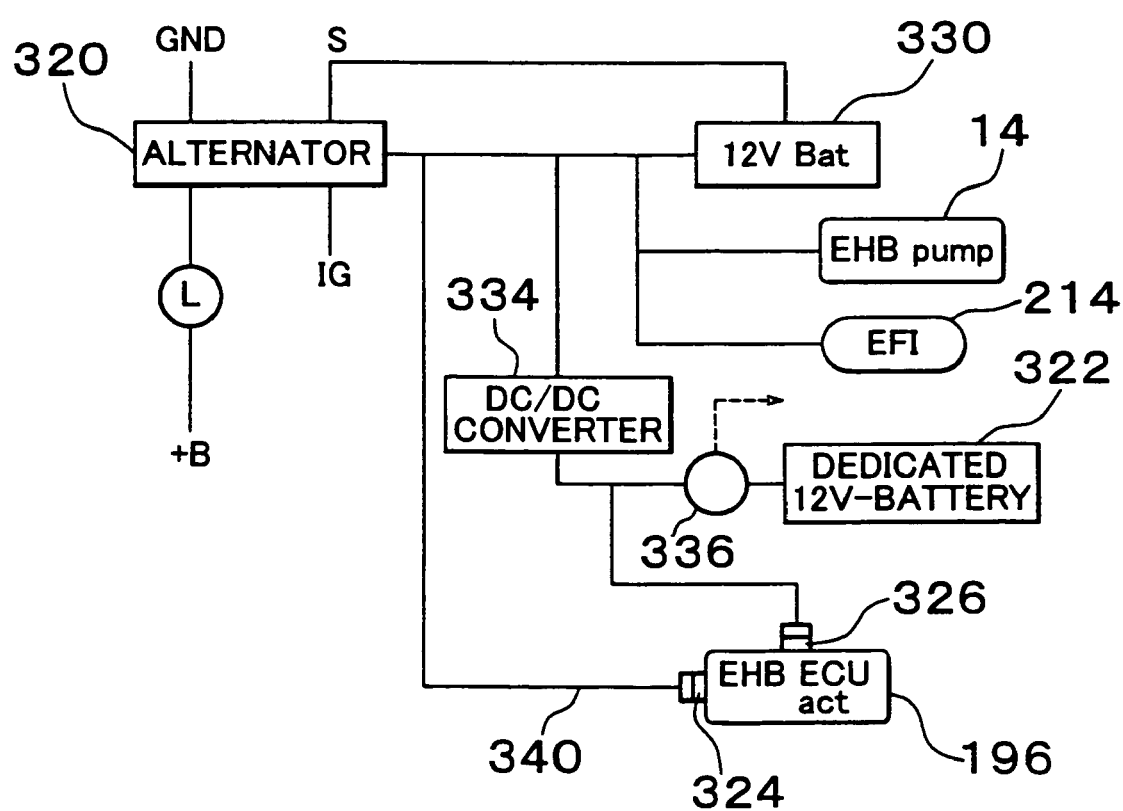
FIG. 14 shows a drive system of the brake fluid pressure control device according to another embodiment of the invention.

Furthermore, the two power units 80, 84 are not limited to those of the aforementioned embodiment. That is, both the power units 80, 84 may be designed to include batteries or generators. As shown in FIG. 14, one of the power units can be used as a dedicated power unit for the fluid-pressure-control electric loading device 196.

In this embodiment, a power unit 320 including an alternator is connected to fluid-pressure-control electric loading device 196 through line 340 and via connector 324, and a power unit 322 including a dedicated 12V-battery is connected to the fluid-pressure-control electric loading device 196 via the connector 326.

A 12V-battery 330 is connected to the power unit 320. The power unit 320 is supplied with electric energy generated by the alternator. The fluid-pressure-control electric loading device 196 is connected to a voltage converter 334. The power unit 322 is connected to the voltage converter 334. The power unit 322 is supplied with electric energy from the alternator. Even if the output voltage of the alternator has changed, the 12V-battery is supplied with electric energy having a constant voltage due to the voltage converter 334. Therefore, the 12V-battery is prevented from being supplied with an excessively high voltage.

Furthermore, the power unit 322 is provided with a battery state detector 336 to detect a charge amount and a degree of deterioration of the dedicated 12V-battery.

In this embodiment, the dedicated battery 322 is connected to the fluid-pressure-control electric loading device 196. Therefore, even if the power unit 320 starts operating abnormally, electric energy can be supplied with high reliability. In the case of a common battery, if a large amount of electric energy has been consumed by other electric energy consumption devices, it may be impossible to supply a sufficient amount of electric energy to the fluid-pressure-control electric loading device 196. However, in the case of a dedicated battery, a sufficient amount of electric energy can be reliably supplied to the fluid-pressure-control electric loading device 196.

In this embodiment, both the electric energy supplied from the power unit 320 and the electric energy supplied from the dedicated battery 322 are equal to 12V.

Figure 15:
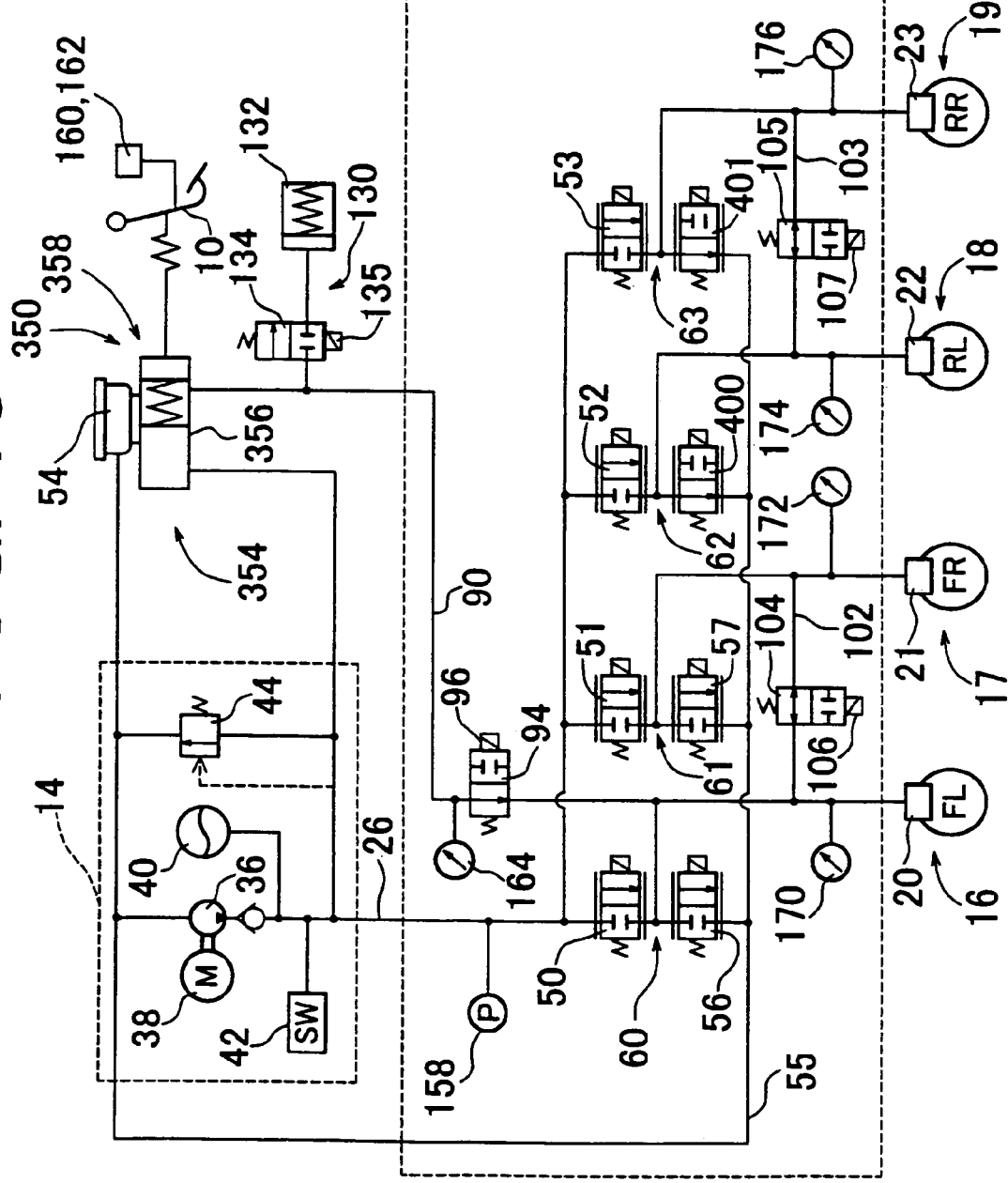
FIG. 15 is a circuit diagram of a brake device including the brake fluid pressure control device according to still another embodiment of the invention.

In addition, the brake device may be constructed as shown in FIG. 15. The brake device according to this embodiment is provided with a master cylinder 350 which has a hydrobooster instead of the master cylinder 12. The master cylinder 350 equipped with the hydrobooster is actuated by high-pressure operating fluid supplied from the pump device 14. The master cylinder 350 includes a fluid pressure booster 354 and a master cylinder 358. The fluid pressure booster 354 generates a fluid pressure corresponding to an operation force of the brake pedal 10. The master cylinder 358 includes a pressurizing chamber 356. The fluid pressure booster 354 boosts an operation force of the brake pedal 10, thereby generating a boosted fluid pressure in the pressurizing chamber 356.

The brake cylinder 20 for the front-left wheel is connected to the pressurizing chamber 356 via the fluid passage 90. The brake cylinder 22 for the rear-left wheel is not connected to the pressurizing chamber 356. Only the pump device 14 is connected to the brake cylinders 22, 23 for the rear wheels. That is, the master cylinder 350 equipped with the hydrobooster is not connected to the brake cylinders 22, 23.

Figure 16:
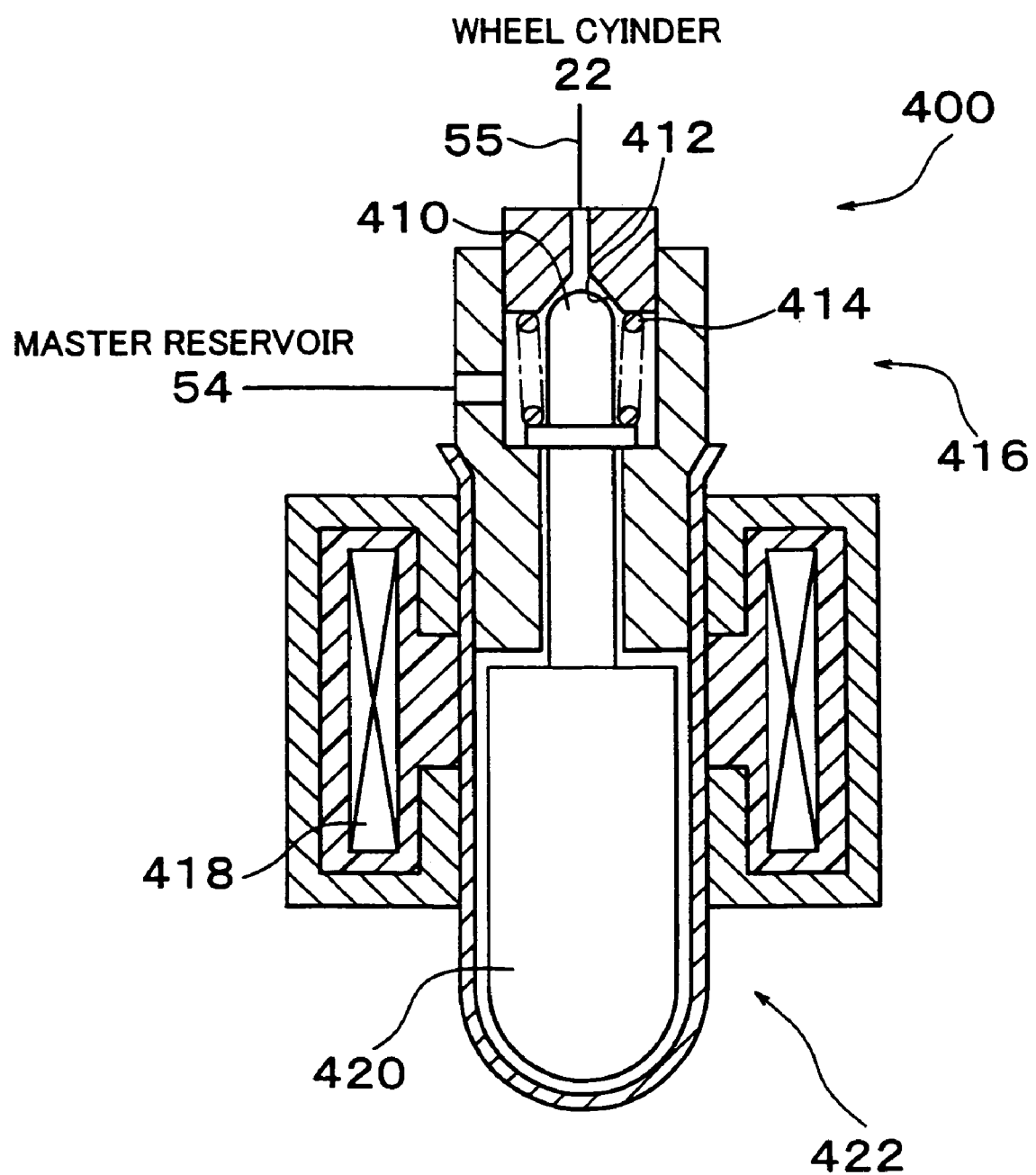
FIG. 16 shows a pressure-reducing linear valve included in the brake fluid pressure control device.

The pressure-reducing linear valves included in the rear-wheel-side linear valve devices 62, 63 are pressure-reducing linear valves 400, 401 that are normally closed. The pressure-reducing linear valves 400, 401 are structurally identical to each other. Therefore, only the pressure-reducing linear valve 400 will be described with reference to FIG. 16. The pressure-reducing linear valve 400 includes a seating valve 416 and a solenoid 422. The seating valve 416 includes a valve body 410, a valve seat 412 and a spring 414. The solenoid 422 includes a coil 418 and a movable portion 420. An urging force of the spring 414 is applied in a direction that moves the valve body 410 away from the valve seat 412. As is the case with the urging force of the spring 414, a differential pressure operation force corresponding to a difference in fluid pressures across the pressure-reducing linear valve 400 is also applied in a direction that moves the valve body 410 away from the valve seat 412. While no electric energy is being supplied to the coil 418, the pressure-reducing linear valve 400 is kept open. That is, the pressure-reducing linear valve 400 is normally open. If electric energy is supplied to the coil 418, an electromagnetic driving force is applied in a direction that urges the valve body 410 to come into contact with the valve seat 412. If the electromagnetic driving force is greater than the sum of the differential pressure operation force and the urging force as mentioned above, the pressure-reducing linear valve 400 is closed.

The rear-wheel-side pressure-reducing linear valves 400, 401 are normally open. Therefore, if supply of electric energy to the coil 418 of the pressure-reducing linear valves 400, 401 is stopped (an open state) upon cancellation of braking operation, the operating fluid in the brake cylinders 22, 23 can reliably be returned to the master reservoir 54. Thus, it becomes possible to prevent the occurrence of dragging.

If the pressure-reducing linear valves are normally closed, electric energy needs to be supplied to the coil 418 for a period that is longer than a period required to return all the operating fluid in the brake cylinders to the master reservoir 54. The pressure-reducing linear valves would need to be kept open for a set period from cancellation of braking operation. However, if the set period is short, it is impossible to return all the operating fluid. This may lead to the occurrence of dragging. If the pressure-reducing valves are normally open, the occurrence of dragging can reliably be prevented.

The front-wheel-side pressure-reducing linear valves 56, 57 are normally closed. However, if they are opened again by stopping supply of electric energy to the coil 98 of the master shut-off valve 94 upon cancellation of braking operation, operating fluid is returned to the pressurizing chamber 356 through the fluid passage 90. Therefore, the pressure-reducing linear valves 56, 57 need not be normally open valves.

Besides, if the pressure-reducing linear valves are normally open, it is necessary to close them immediately when operating the brake. This may cause a lag in emergence of braking effect. In this case, since the rear-wheel-side braking force is smaller than the front-wheel-side braking force, the influence of a lag in emergence of braking effect on the side of the rear wheels exerted on the entire vehicle is smaller than the influence on the side of the front wheels. Thus, it stands to reason that the pressure-reducing linear valves 400, 401 on the side of the rear wheels can be normally open instead of those on the side of the front wheels.

In this embodiment, the master cylinder 350 equipped with the hydrobooster is used instead of the master cylinder 12. Therefore, even if the brake cylinders 20–23 have been shut off from the pump device 14, a fluid pressure higher than the fluid pressure caused by an operation force can be transmitted to the brake cylinders 20, 21. Because there is no need to provide the master shut-off valve (SMCR), it is accordingly possible to achieve reductions in cost and size. Although the rear-wheel-side communication valves are not indispensable, removal thereof makes it possible to achieve further reductions in cost and size. An art for designing pressure-reducing valves as normally closed valves can widely be applied to a brake device having pressure-reducing valves, such as a brake device in which the master cylinder 350 equipped with the hydrobooster is connected to the rear-wheel-side brake cylinder and the brake device shown in FIG. 1.

The structure of the brake device including the brake fluid pressure control device of the invention can be determined arbitrarily. For example, a plurality of electromagnetic switching valves can be employed instead of the linear valve devices. Alternatively, the stroke simulator device 130 may be provided on the side of the front wheels. Furthermore, it is possible to divide a plurality of signal lines L* connecting the brake ECU 150 to the pump device 14 into a group including lines corresponding to the control circuit 230 and a group including lines corresponding to the control circuit 232 so that separate connectors are used to connect the lines in the respective groups. In this construction, even if one of the connectors starts operating abnormally, it is possible to transmit a control signal to one of the control circuits and actuate the pump motor 38.

The method of detecting a charge amount and a degree of deterioration of the battery is not limited to that of the aforementioned embodiments. Furthermore, in the aforementioned embodiments, the power unit 80 includes an alternator for generating electric energy through rotation of the engine. However, in the case where a vehicle equipped with the brake fluid pressure control device includes an electric motor as a drive source, a motor for driving the electric motor can be included in the power unit 80.

While the present invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A brake fluid pressure control device comprising:
   a fluid pressure control unit that is operated by electric energy and has a plurality of fluid pressure control valves that control fluid pressures in a plurality of brakes to inhibit rotation of a plurality of wheels;
   an electric energy supply device that includes a plurality of power sources and that supplies electric energy to the fluid pressure control valves;
   the electric energy supply device supplies electric energy to at least one of the fluid pressure control valves independently from at least two power sources of the plurality of power sources through respective power lines.

2. The brake fluid pressure control device according to claim 1, wherein:
   the power sources have different rated voltages.

3. The brake pressure control device according to claim 1, wherein:
   each of the fluid pressure control valves includes a solenoid having a coil and a movable portion operated in accordance with a state of supply of electric energy to the coil;

the solenoid of the fluid pressure control valves has a plurality of coils connected to power lines of the plurality of power sources.

4. The brake fluid pressure control device according to claim 1, further comprising:

a pump device that has a pump that pressurizes and discharges operating fluid and a pump motor that generates a driving force by electric energy and drives the pump by the driving force, wherein:

the fluid pressure control valves control fluid pressures in the brakes based on a fluid pressure in the pump device; and the electric energy supply device supplies electric energy to the pump motor independently from the plurality of power sources.

5. The brake fluid pressure control device according to claim 4, wherein:

the pump motor includes a coil disposed in at least one of a stator and a rotor and drives the pump by a driving force generated by supplying electric energy to the coil; and the coil includes a plurality of coil members connected to power lines of the plurality of power sources.

* * * * *